United States Patent
Edgar

(10) Patent No.: US 11,610,152 B2
(45) Date of Patent: Mar. 21, 2023

(54) MACHINE LEARNING MODEL DEVELOPMENT AND OPTIMIZATION PROCESS THAT ENSURES PERFORMANCE VALIDATION AND DATA SUFFICIENCY FOR REGULATORY APPROVAL

(71) Applicant: GE Precision Healthcare LLC, Milwaukee, WI (US)

(72) Inventor: Marc T. Edgar, Glenmont, NY (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 587 days.

(21) Appl. No.: 16/728,489

(22) Filed: Dec. 27, 2019

(65) Prior Publication Data

US 2021/0201190 A1    Jul. 1, 2021

(51) Int. Cl.
  *G06F 16/00*   (2019.01)
  *G06N 20/00*   (2019.01)
  *G06N 5/04*    (2023.01)

(52) U.S. Cl.
  CPC ............. *G06N 20/00* (2019.01); *G06N 5/04* (2013.01)

(58) Field of Classification Search
  CPC .................................. G06N 20/00; G06N 5/04
  See application file for complete search history.

(56) References Cited

U.S. PATENT DOCUMENTS

2016/0210435 A1* 7/2016 Neumann ............ G09B 23/288
2020/0202171 A1* 6/2020 Hughes ................ G06N 20/00

OTHER PUBLICATIONS

"Prediction interval," https://en.wikipedia.org/wiki/Prediction_interval, Last accessed Dec. 23, 2019, 9 pages.
Hyndman, "The difference between prediction intervals and confidence intervals," https://robjhyndman.com/hyndsight/intervals/, Mar. 12, 2013, 3 pages.
Bernhardsson, "The hacker's guide to uncertainty estimates," https://erikbern.com/2018/10/08/the-hackers-guide-to-uncertainty-estimates.html, Oct. 8, 2018, 20 pages.

(Continued)

*Primary Examiner* — Hung Q Pham
(74) *Attorney, Agent, or Firm* — Amin, Turocy & Watson, LLP

(57) ABSTRACT

Machine learning model development and optimization tools are provided that ensure performance validation and data sufficiency for regulatory approval. According to an embodiment, a computer implemented method can comprise training a machine learning model to perform an inferencing task on an initial set of data samples included in a sample population. In various embodiments, the model can include a medical AI model. The method further comprises determining, by the system, subgroup performance measures for subgroups of the data samples respectively associated with different metadata factors, wherein the subgroup performance measures reflect performance accuracy of the machine learning model with respect to the subgroups. The method further comprises determining, by the system, whether the machine learning model meets an acceptable level of performance for deployment in a field environment based on whether the subgroup performance measures respectively satisfy a threshold subgroup performance measure.

25 Claims, 12 Drawing Sheets

(56) References Cited

OTHER PUBLICATIONS

"Confidence interval," https://en.wikipedia.org/wiki/Confidence_interval, Last accessed Dec. 23, 2019, 23 pages.
"Confidence Interval Calculator," https://www.mathsisfun.com/data/confidence-interval-calculator.html, Last accessed Dec. 23, 2019, 2 pages.

* cited by examiner

IMDRF/FDA SaMD Risk Stratification

| State of Healthcare situation or condition | Significance of information provided by SaMD to healthcare decision | | |
|---|---|---|---|
| | Treat or diagnose | Drive clinical management | Inform clinical management |
| Critical | IV | III | II |
| Serious | III | II | I |
| Non-serious | II | I | I |

MACHINE LEARNING MODEL DEVELOPMENT AND OPTIMIZATION PROCESS THAT ENSURES PERFORMANCE VALIDATION AND DATA SUFFICIENCY FOR REGULATORY APPROVAL

TECHNICAL FIELD

This application is directed to machine learning model development and optimization tools that ensure performance validation and data sufficiency for regulatory approval, particularly with respect to medical machine learning models.

BACKGROUND

Artificial intelligence (AI) and machine learning (ML) is a rapidly progressing technical field impacting a wide range of industries. Advancements in machine learning technologies such as deep neural networks and have recently shown impressive performance, sometimes exceeding humans, in various AI domains, including computer vision, speech, natural language processing (NPL), bioinformatics, drug design, medical image analysis, and more. As machine learning algorithms continue to evolve to enable increasingly more sophisticated and precise automated inferencing capabilities, the goal of keeping AI's impact on society beneficial has drawn attention to areas of verification, validity, security and control. For example, while NLP technical errors of an AI personal assistant in interpreting everyday commands may be irritating, the accuracy of AI based outputs becomes much more important when they control cars, planes, automated trading systems, power grids and security systems.

The performance accuracy of machine learning models/algorithms used in the medical context is of critical importance, particularly in scenarios in which the output of the machine learning models/algorithms control the operation of a life sustaining medical device. Medical software refers to any software or system used within a medical context, such as standalone software used for diagnostic or therapeutic purposes, software embedded in a medical device, software that drives a medical device or determines how it is used, software that acts as an accessory to a medical device, software used in the design, production, and testing of a medical device, and software that provides quality control management of a medical device. Software that is classified as a medical device is often referred to as software as a medical device (SaMD).

The introduction of AI and machine learning applications into medical software has created new regulatory challenges. The regulatory environment for medical software can have varying requirements and levels of scrutiny depending on the type, intended use, and level of risk associated with the software. For example, prior to authorized usage in clinical practice as a "cleared medical product," some regulatory agencies (e.g., the Food and Drug Administration (FDA)) require software classified as a medical device to comply with the same regulatory pathway used for tangible medical devices. Under the existing model of medical device regulation, a machine learning algorithm will be verified and validated, and then submitted for approval. Demonstration of data sufficiency and algorithm performance is a key part of any regulatory submission for a healthcare AI algorithm. However, there does not exist a standardized objective mechanism to assert that an AI algorithm has achieved a sufficient performance level for regulatory approval.

SUMMARY

The following presents a summary to provide a basic understanding of one or more embodiments of the invention. This summary is not intended to identify key or critical elements or to delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products are described that provide machine learning model development and optimization tools that ensure performance validation and data sufficiency for regulatory approval. The disclosed techniques can be applied to machine learning models used in various domains. In one or more embodiments, the disclosed techniques are applied to facilitate the development and optimization of medical AI models using an objective mechanism to ensure data sufficiency and performance validation.

According to an embodiment, a system can comprise a memory that stores computer executable components and a processor that executes the computer executable components stored in the memory. The computer executable components can comprise a model training component that trains a machine learning model to perform an inferencing task on an initial set of data samples included in a sample population. The computer executable components can further comprise a performance evaluation component that determines subgroup performance measures for subgroups of the data samples respectively associated with different metadata factors, wherein the subgroup performance measures reflect performance accuracy of the machine learning model with respect to the subgroups. For example, in some implementations, the data samples comprise medical images and the different metadata factors include image-based factors and clinical factors. The computer executable components can further comprise an approval regulation component that determines whether the machine learning model meets an acceptable level of performance for deployment in a field environment based on whether the subgroup performance measures respectively satisfy a threshold subgroup performance measure.

In one or more implementations, the subgroup performance measures respectively comprise uncertainty estimate values representative of a degree of uncertainty in the performance accuracy of the machine learning model with respect to the subgroups, and wherein the threshold subgroup performance measure comprises a maximum uncertainty value. For example, in some implementations, the subgroup performance measures respectively comprise lower prediction bound values of the performance accuracy of the machine learning model with respect to the subgroups, and wherein the threshold subgroup performance measure comprises a minimum lower prediction bound value. In one or more implementations, the threshold subgroup performance measure is based on an accepted level of performance accuracy of an entity that currently performs the inferencing task in the field.

In some embodiments, the computer executable components further comprise a sample selection component that selects the initial set of data samples from a collection of population data samples for the sample population. In some implementations, the sample selection component can randomly select at least some of the data samples included in the initial set. In other implementations, the sample selection component can receive input identifying metadata factors associated with a potential degree of variation in the performance accuracy of the machine learning model, and select at least some of the data samples included in the initial set from a collection of population data samples for the sample population based on the at least some of the data samples respectively comprising one or more of the metadata factors.

In some embodiments, one or more of the subgroups of the data sample can be predefined based on domain expertise identifying known metadata factors and/or groups of metadata factors associated with the data samples that may be a source of variation in the performance of the machine learning model. In other implementations, the computer executable components further comprise a grouping component that automatically generates the different subgroups of the data samples based on the different metadata factors using a data driving grouping/clustering process.

In some embodiments, based on a determination that a subgroup of the subgroups has a subgroup performance measure that fails to satisfy the threshold subgroup performance measure, the approval regulation component can disapprove the machine learning model as having the acceptable level of performance for deployment in the field environment on new data samples included in the subgroup. The system can also employ an active learning process to facilitate automatically identifying and collecting relevant new data samples for optimizing/improving the performance of the machine learning model when the performance does not satisfy defined performance criteria. With these embodiments, the computer executable components can further comprise an active learning component that identifies underperforming subgroups of the subgroups based on the subgroup performance scores associated with the underperforming subgroups failing to satisfy the threshold subgroup performance measure. The computer executable components can further comprise an active sampling component that retrieves additional data samples for the underperforming subgroups from a collection of population data samples for the sample population.

In some implementations, the active sampling component can evaluate potential new data samples based on a degree to which the potential new data samples will contribute to optimizing the performance accuracy of the machine learning model and select the additional data samples from the potential new data samples based on the evaluating. For example, in one or more implementations, the active sampling component can determine a difficulty score for the underperforming subgroups and select the additional data samples that maximize a change to the difficulty score. In another example implementation, the active sampling component can determine priority scores for potential new data samples based on the subgroup performance scores of the underperforming subgroups that the potential new data samples respectively belong and select the additional data samples from the potential new data samples based on the priority scores. Furthermore, in some embodiments, the active sampling component can determine an amount of the additional data samples to retrieve using an entitlement function.

The model training component can further update the machine learning model using the additional data samples, resulting in an updated machine learning model, and the performance evaluation component can further update the subgroup performance measures based on the performance accuracy of the updated machine learning model with respect to the underperforming subgroups. The active sampling component can further continue to retrieve the additional data samples and the model training component continues to train and update the machine learning model using the additional data samples until all of the subgroup performance measures respectively satisfy the threshold subgroup performance measure or maximum amount of the additional data samples authorized for retrieval has been reached.

In some embodiments, elements described in connection with the system can be embodied in different forms such as a computer-implemented method, a computer program product, or another form.

DESCRIPTION OF THE DRAWINGS

For example.

FIG. 6 presents a table outlining SaMD risk stratification guidelines recommended by International Medical Device Regulators Forum (IMDRF) and the FDA.

DETAILED DESCRIPTION

Figure 1:
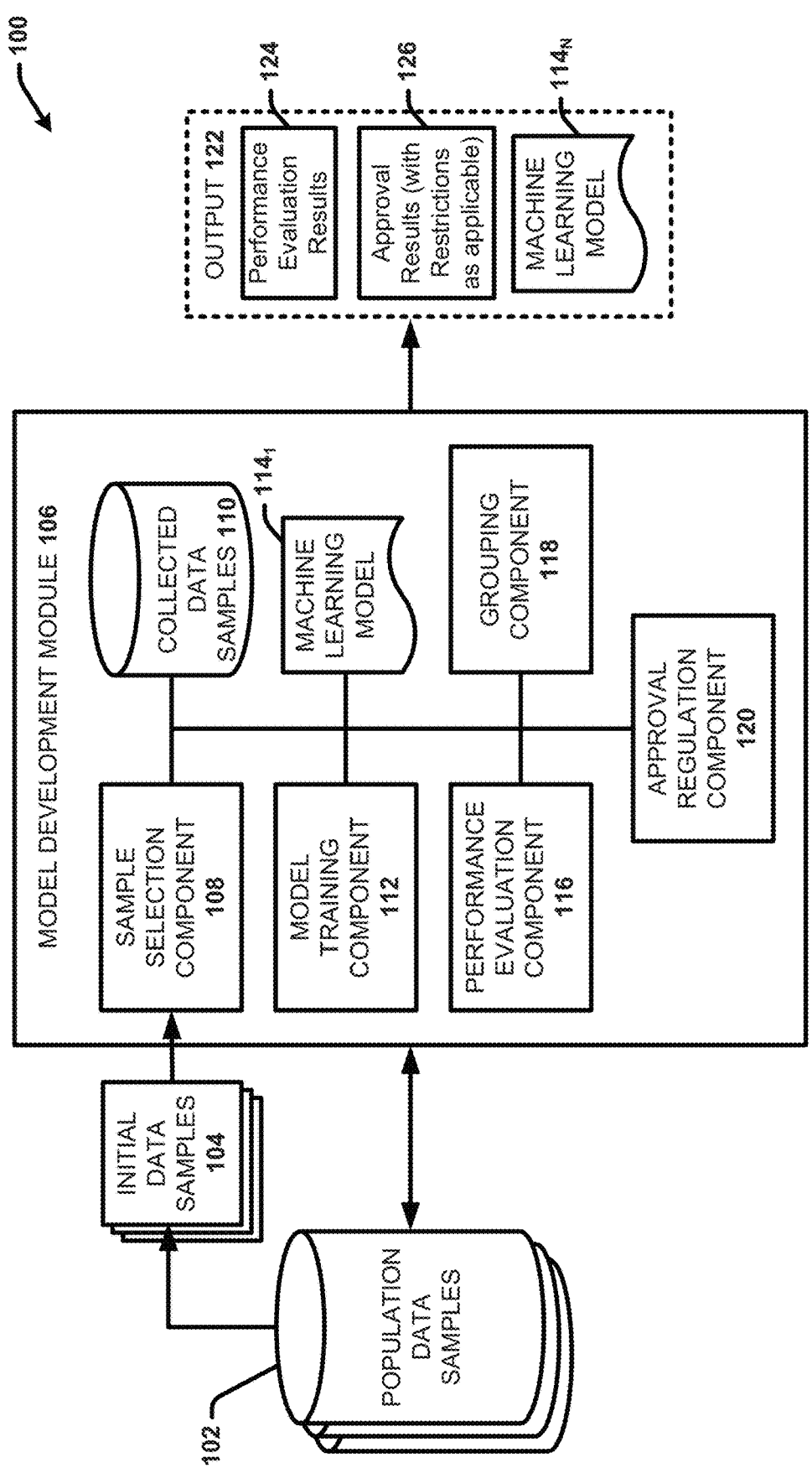
FIG. 1 illustrates a block diagram of an example, non-limiting system that provides machine learning model development and optimization tools to ensure performance validation and data sufficiency for regulatory approval in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The disclosed subject matter provides systems, computer-implemented methods, apparatus and/or computer program products that provide machine learning model development and optimization tools that ensure performance validation and data sufficiency for regulatory approval. In this regard, two of the most common questions of healthcare AI developers are: "How much data do I need to train and validate my algorithm?", and "When is my algorithm good enough?" The disclosed subject matter provides a model development process that is based on answering these questions using a data-driven framework to organize regulatory criteria. In various embodiments, the process provides for estimating the amount of data required for training and validation, a halting criterion for development. The process further provides for automatically identifying meaningful subgroups that should be improved on or excluded from the intended population and insuring that sufficient data has been used to achieve an acceptable level of model performance across all sub-groups by maximizing predictive certainty.

In one or more embodiments, the disclosed model development techniques involve initially training and developing a machine learning model to perform a specific inferencing task on an initial data set of data samples. The performance of the model is then evaluated using objective, data driven techniques, metrics and acceptance criteria to ensure performance validation and data sufficiency for regulatory approval. In various embodiments, the performance evaluation/validation involves measuring the overall model performance (e.g., relative to the whole population of data samples), as well as measuring the performance of the model with respect to subgroups of the data samples respectively representative of different subgroups of the population. For example, in implementations in which the data samples comprise medical images, the different subgroups of the medical images can be based on different image-based factors (e.g., acquisition device modality, vendor, model, protocol, exam type, image artifacts, contrast, sharpness, noise, etc.) and/or clinical factors (e.g., diagnosis, procedure, implants, patient demographics, etc.). In some implementations, an automated data driven process can be used to group the data samples into the subgroups.

In some embodiments, the performance evaluation can involve determining uncertainty estimate values for the model that representative of a degree of uncertainty in the performance accuracy of the model with respect to the entire population and with respect to the subgroups. The performance evaluation can also include a data sufficiency analysis that involve evaluating how the performance of the model would change based on increasing the number of training data samples using an entitlement function. In some implementations, the data sufficiency analysis can result in a determination of a predicted amount of additional data samples needed to achieve a defined performance level (e.g., overall and/or for the respective subgroups). In various embodiments, the defined performance level can be data driven threshold that is determined based on an accepted level of performance accuracy of an entity that currently performs the inferencing task in the field.

The disclosed techniques further provide an approval regulation process that employs an objective, data driven method to determine when the model has reached a sufficient level of performance for deployment in the field, and when a sufficient amount of data has been used to train and develop the model, based on the results of the performance evaluation. In various embodiments, the approval regulation process can involve determining whether to approve the model for deployment based on whether the uncertainty measures for the respective subgroups satisfy a defined uncertainty measure threshold. This uncertainty measure threshold can also be determined based on an accepted level of performance accuracy of the entity that currently performs the inferencing task in the field. In some embodiments, the approval regulation process can involve evaluation of the data sufficiency results in association with determining whether to approve the model for deployment. For example, approval regulation can be based on whether a sufficient amount of training data has been used to train the model based on an expected degree of increase in the performance of the model if additional training samples were to be applied. This process of justification that sufficient data was used algorithm training and regulatory validation provides an easy to follow criteria for halting data collection and algorithm development as well as a statistically sound evaluation for technical design reviews and regulatory submission.

The disclosed techniques further provide an active learning and model optimization process based on identification of underperforming subgroups. In this regard, the active learning process can identify underperforming subgroups based on their performance measures (e.g., uncertainty values) falling below the defined threshold value. Additional data samples for the underperforming subgroups can then be automatically identified and retrieved from one or more data sources and used to further train and update the model. In various embodiments, the number/amount of additional data samples to retrieve for each subgroup can be determined using the entitlement function (e.g., the data sufficiency analysis). Discriminatory data sample selection techniques are also provided to facilitate identifying the "best" additional data samples to prioritize retrieving for continued model training and optimization based on an estimated degree of their contribution to improving the performance of the model. In various embodiments, the retrieving of the additional data samples and the updating of the machine learning model using the additional data samples can continue until the desired level of performance of the model on overall and/or with respect to the subgroups is reached, or a cap on model development has been reached (e.g., regarding a maximum amount of the additional data samples authorized for retrieval, a monetary cap, a time cap, etc.).

The subject techniques provide several technical advantages. For example, the disclosed techniques provide for building better algorithms faster while minimizing costs associated with unnecessary continued training and usage of data samples that do not add to improving model performance. The disclosed techniques further provided for reduce or eliminate manual involvement in data collection. The disclosed techniques further provide a standardized, scalable process for model building and objective validation for regulatory approval and create a durable performance advantage with continuous learning.

The disclosed techniques can be applied to machine learning models used in various domains. In this regard, various embodiments of the disclosed subject matter provide techniques for developing and evaluating machine learning models/algorithms that are used in medical device software products, such as machine learning models that provide clinical diagnosis, machine learning models that control operations of a medical device, and the like. However, the disclosed techniques are not limited to the healthcare domain. In this regard, the disclosed techniques can be applied to facilitate AI model development and optimization in various domains. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates enhancing the efficiency and accuracy of annotating data samples for supervised machine learning algorithms in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

For example, system 100 includes a model development module 106 that can be and include computer/machine executable components. In the embodiment shown, the computer/machine executable components of the model development module 106 include a sample selection component 108, a model training component 112, a machine learning model $114_1$, a performance evaluation component 116, a grouping component 118 and an approval regulation component 120. These computer/machine executable components (and other described herein) can be stored in memory (not shown) associated with the one or more machines (not shown). The memory can further be operatively coupled to at least one processor (not shown), such that the components (e.g., the model development module 106 itself, the sample selection component 108, the model training component 112, the machine learning model $114_1$, the performance evaluation component 116, the grouping component 118 the approval regulation component 120, and other components described herein), can be executed by the at least one processor to perform the operations described. Examples of said and memory and processor as well as other suitable computer or computing-based elements, can be found with reference to FIG. 12, and can be used in connection with implementing one or more of the systems or components shown and described in connection with FIG. 1 or other figures disclosed herein.

In various embodiments, the model development module 106 facilitates developing machine learning models/algorithms (e.g., machine learning model $114_1$) using a model development process that ensures performance validation and data sufficiency for regulatory approval. The terms "model" and "algorithm" are used herein synonymously. In one or more embodiments, model development process initially training and developing a machine learning model $114_1$ by the model training component 112 to perform a specific inferencing task on an initial data set of data samples, depicted in system 100 as initial data samples 104. The type of the machine learning model $114_1$ can vary. For example, the machine learning model $114_1$ can be or include essentially any type of machine learning model configured to perform a defined inferencing task (e.g., a classification task, a segmentation, a regression task, a detection task, etc.) based on a defined population of input data or input data samples. For example, the machine learning model $114_1$ can be or include a nearest neighbor model, a naïve Bayes model, a decision tree model, a boosting model, a gradient boosting model, a linear regression model, a neural network model, a k-means clustering model, an association rules model, a q-learning model, a temporal difference model, a deep adversarial network model, or a combination thereof. The specific task and type of input data evaluated by the machine learning model $114_1$ can also vary. For example, various embodiments are exemplified wherein the machine learning model $114_1$, model comprises a model configured generate inferences based on analysis of medical images. For example, in one implementation the machine learning model $114_1$ can be or include neural network model configured to diagnose presence or absence of a medical condition or disease reflected in the medical images.

In the embodiment shown, system 100 can include one or more databases 102 (or other suitable data sources) that include or otherwise provide the input data samples for model trading and development, referred to in system 100 as population data samples. For example, in implementations in the machine learning model $114_1$ comprises a medical image analysis model, the input data samples can comprise a variety of annotated and unannotated (e.g., for validation) medical images. In accordance with this example, the one or more databases 102 can include picture archiving and communication systems (PACS)s, medical image acquisition devices, and other types of data sources that provide the medical images.

The data samples included in the one or more databases 102 are referred to herein as "population" data samples to indicate that these data samples are assumed to be representative of all or "most" of the variants of data samples that the machine learning model $114_1$ is expected to see and intended to be applied to when deployed in the field. In this regard, because the supervised training paradigm is dependent upon rich and varied data, it is imperative that training data be accurate and represent all or most of the variants the algorithm could 'see' when new data is presented to it. For example, consider development of a diagnostic model configured to evaluate chest x-rays to classify them as normal versus abnormal. There could be hundreds of different variables that would make an x-ray abnormal. Thus, to train the diagnostic model, a corpus of training data would be needed that shows all the possible representations of all those different variables compared to representations that would be classified as normal. In various embodiments, the one or more databases 102 provide this corpus of data samples for training and developing the machine learning model $114_1$.

In one or more embodiments, the sample collection component 108 can collect the initial data samples 104 from the one or more databases 102 for usage by the model training component 112 for the initial training and development of the machine learning model $114_1$. In some implementations, the initial data samples 104 can be collected and stored in a suitable data structure accessible to the model development module. For example, in the embodiment shown, the initial data samples 104 can be stored in an internal database referred to as collected data samples 110. Selection of the initial data samples 104 can be random, targeted based on domain knowledge, or a combination of the two. For example, in some embodiments, the sample selection component 108 can randomly select initial set data samples 104 from the population data samples. In other implementations, the sample selection component 108 can receive or access information identifying distinguishing factors or features of the population data samples that are determined to be or expected to be a source of variance in the performance of the machine learning model $114_1$. With these implementations, the sample selection component 108 can select at least some of the initial data samples 104 based on the at least some of the data samples respectively comprising one or more of the previously defined factors or features to ensure the initial data set provides at least some distribution of different population subgroups that could be attributed to variance in the performance of the model. For example, when it comes to medical image processing AI models, a variety of factors can vary between the input images that could be source of variance model performance, including image-based factors and clinical factors.

Figure 2:
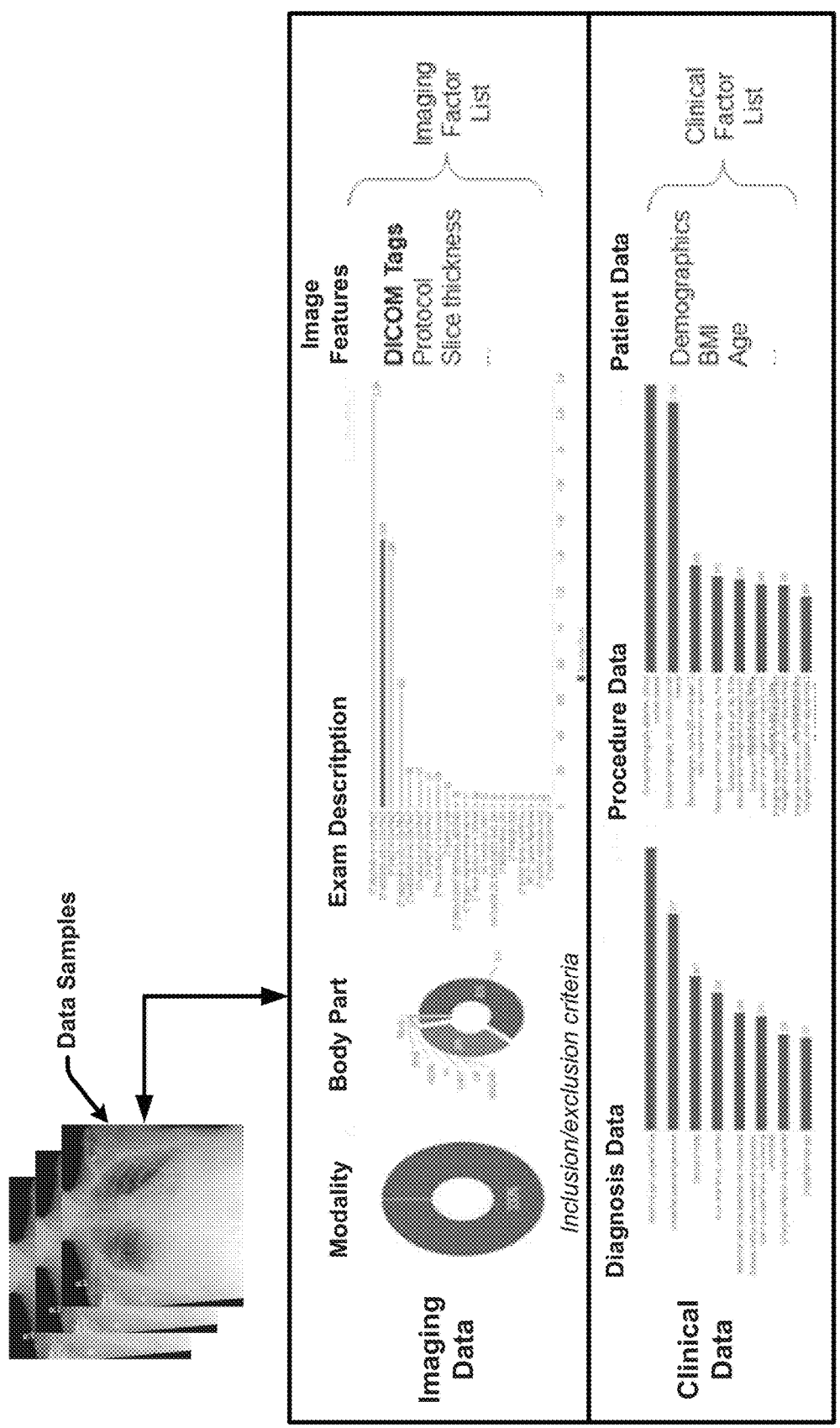
FIG. 2 illustrates some example image-based factors and clinical factors that can be vary between medical images and attributed to variance in model performance in accordance with one or more embodiments of the disclosed subject matter.

FIG. 2 illustrates some example image-based factors and clinical factors that can be vary between medical images and attributed to variance in model performance. For example, the image-based factors can include factors based on modality, body part, and various exam specific features taken from the exam descriptions. For instance, some the image-based factors can include factors related to capture equipment and software (e.g., modality, vendor, model, version, software revision, recognition algorithm, etc.), acquisition (e.g., procedure code, protocol, settings, mode, dose, patient position, slice thickness, etc.), image quality (e.g., artifacts associated motion, artifacts associated with implants, contrast, sharpness, noise, etc.), and the like. The clinical factors can include, diagnostic related factors (e.g., diagnosis codes, comorbidities, etc.), procedure related factors (e.g., regarding procedure type/code, location, physician that performed the procedure, etc.) and patient related factors (e.g., including demographic factors such as gender, ethnicity, age, weight, body mass index, trauma, diseases and state, implants, medical history factors, etc.). In various embodiments, these example image-based factors and clinical factors can include factors identified by technical and clinical domain experts as factors that are a potential source of variation in the performance of the machine learning model $114_1$ and/or potentially make the output (e.g., the image pixels, the signal, the waveform, etc.) vary in a systematic way.

With reference again to FIG. 1, the model training component 112 can employ various existing and/or standard machine learning model development techniques to train and develop the machine learning model $114_1$. For example, in some implementations, the model training component 112 can (randomly or with user input) divide the initial data samples 104 into a model building datasets, (training, validation and test), and a regulatory validation dataset. In some implementations, the model training component 112 can also divide the initial data samples into a training dataset, a test set, a validation dataset and regulatory validation dataset. The model training component 112 can further employ the training set and/or the test set to train/develop and fine tune the machine learning model $114_1$. The performance evaluation component 116 can further employ the validation dataset to evaluate the performance of the machine learning model $114_1$. In some embodiments, the model training component 112 can also generate a regulatory validation dataset from the initial data samples. The regulatory validation dataset is the one which is specifically used for a regulatory filing and is carefully curated, has limited access, and might require 21 CFR Part 11 Compliance, etc. In this regard, the regulatory validation dataset can be used to specifically evaluate performance of the machine learning model $114_1$ in association with determining whether the performance of the machine learning model $114_1$ meets strict requirements for regulatory approval.

The performance evaluation component 116 can further evaluate the performance of the machine learning model $114_1$ using novel techniques, metrics and acceptance criteria to ensure performance validation and data sufficiency for regulatory approval. In this regard, with respect to medical AI models/algorithms, to pass regulatory approval the regulator must be convinced that an algorithm has a high enough performance to meet a clinical need and the benefits as outweigh the risks. The amount of data needed to train an algorithm and the threshold for the level of performance needed for regulatory approval depends on multiple regulatory factors. In addition, the selection of an appropriate performance metric that is measurable scoring for each case in the dataset and should directly measure the suitability of the algorithm for use in a customer's clinical setting.

In various embodiments, the performance evaluation component 116 can evaluate the performance of the machine learning model $114_1$ using a data sufficiency analysis technique referred to herein as "algorithm entitlement." The algorithm entitlement analysis involves using an algorithm entitlement function (Equation 1 below) to determine whether the amount of data used to train and develop the machine learning model $114_1$ is sufficient to achieve an acceptable level of performance, referred to herein as the minimum acceptable algorithm performance (MAAP). The amount of data can reflect the amount of traning data samples as well as the amount of validation data samples. In particular, there is uncertainty onf the man value of performance of the model which depend on the amount of validation data. This effects the estimate of how much data is needed for sufficiency. This sufficiency evaluation can be computed for each subgroup. Thus, the algorithm entitlement analysis can be used to determine an expected amount of additional training data samples and/or validation data samples that are needed to further train/develop and validate the performance of the model to bring the level of performance up to the MAAP when the model performance level at the current amount of training data samples and/or validation data samples is less than the MAAP.

In this regard, machine learning algorithm accuracy typically improves with additional training data. However, even with infinite data, an algorithm will not have perfect accuracy. The disclosed algorithm entitlement analysis estimates the performance accuracy of the machine learning model $114_1$ with an infinite amount of training data. In various embodiments, the performance evaluation component 116 can determine the performance accuracy of the machine learning model $114_1$ based on application of the trained machine learning model $114_1$ (e.g., as trained on the training data set), to the validation set of data samples (e.g., wherein the validation set is included in the initial data samples 104), and determining the accuracy of the machine learning model $114_1$ on the validation set data using one or more appropriate accuracy valuation metrics. For example, in some implementations, the performance evaluation component 116 can measure the performance accuracy of the machine learning model $114_1$ using the Sørensen-Dice coefficient, referred to herein as a DICE sore. (This metric is also known as the Sørensen-Dice index, Sørensen index and Dice's coefficient, and the "similarity coefficient" or "index"). In other implementations, the performance evaluation component 116 can measure the performance accuracy of the machine learning model $114_1$ using the receiver operating characteristic (ROC) curve and the area under the ROC curve (AUC). In other embodiments, the performance evaluation component 116 can evaluate the performance accuracy of the machine learning model $114_1$ using one or more an uncertainty metrics, and/or one or more confidence metrics.

In one or more embodiments, the performance evaluation component 116 can estimate the algorithm entitlement by sampling various amounts of the training data and extrapolating the trend to infinite amounts of data. For example, in some embodiments, the sample model training component 112 can randomly divide the initial training data included in the initial data samples 104 into a plurality of subsets of training data samples of the same amount (e.g., 100 data samples per subset). In other embodiments, as discussed in greater detail with reference to FIG. 7, the model development module 106 can include an active sampling component 702 that can retrieve incremental amounts of additional training data from the population data samples 102 (e.g., by a defined amount of data samples, such as every 100 additional data samples). In either of these embodiments, the model training component 112 can further train/update the machine learning model $114_1$ on each additional subset/amount of training data in an incremental and additive manner. The performance evaluation component 116 can further evaluate the performance of the machine learning model each time the amount of training data is increased to determine performance trend information that reflects how the model's performance increases as the number of training samples increases. The performance evaluation component 116 can further extrapolate this trend information to infinite amounts of data using the following algorithm entitlement function, Equation 1, to determine the number of training data samples and/or validation data samples needed to achieve the MAAP.

Equation 1

$$\text{Performance}(NumSamples) = \text{Algorithm Entitlement} - C1 * e^{\left(\frac{NumSamples}{LearningRate}\right)}.$$

The algorithm entitlement function shown in Equation 1 is an exponential decay model that will asymptotically converge to a constant Algorithm Entitlement value assuming an infinite number of training samples (e.g. NumSamples in Equation 1). In various embodiments, the sample selection component 108 can determine the unknown coefficients are found by optimizing the root mean squared (RMS) error with the algorithmic learning rate (e.g., LearningRate in Equation 1), wherein the learning rate is the rate that the algorithm improves with as more data is applied. The amount of data needed for cases where the machine learning model $114_1$ has not yet achieved the MAAP can be estimated by finding the number of samples (NumSamples) that makes performance meet the MAAP.

Figure 3:
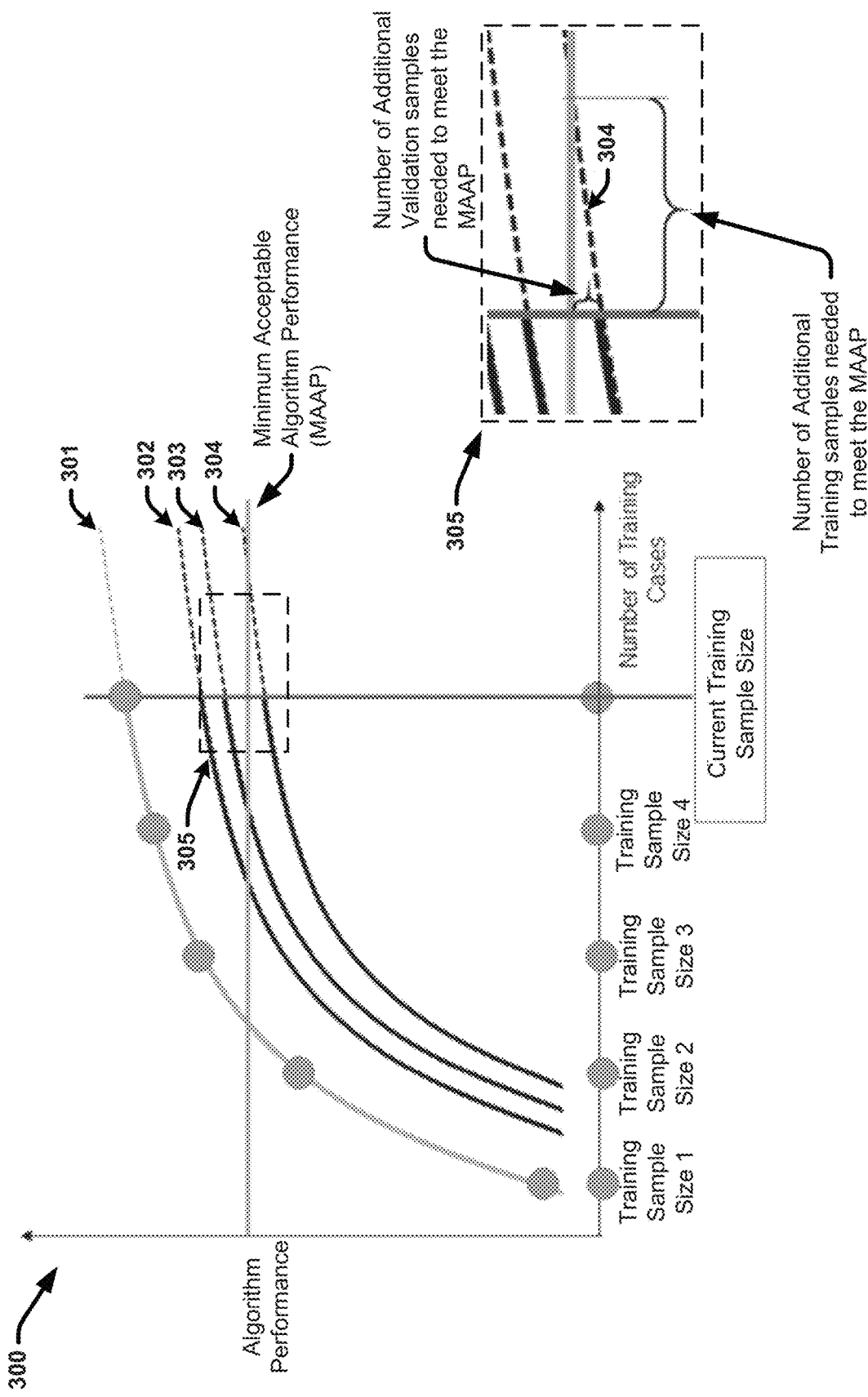
FIG. 3 presents a graph illustrating the concept of algorithm entitlement in accordance with one or more embodiments of the disclosed subject matter.

For example, FIG. 3 presents a graph 300 illustrating the concept of algorithm entitlement in accordance with one or more embodiments of the disclosed subject matter. In particular, graph 300 plots the change in performance accuracy of the machine learning model/algorithm (e.g., measured using a DICE score) as the number of training data samples is increased (e.g., from traning sample size 1, to training sample size 2, and so on). In this regard, the respective training sample sizes (e.g., training sample size 1, traning sample size 2, traning sample size 3, traning sample size 4) corresponds to a different number of training samples, increased by a defined amount. In the embodiment shown, four training curves are plotted, respectively identified as training curve 301, training curve 302, traning curve 303 and training curve 304. Training curve 301 reflects the estimated mean performance of the model/algorithm, training curve 302 reflect an estimated performance of the model/algorithm at a lower performance bound (LPB) of 2000 (e.g., wherein the LPB corresponds to the lower confidence bound for a 95% confidence), traning curve 303 reflects an estimated performance of the the model/algorithm at a LPB of 1000, and training curve 304 corresponds to the current performance of the model/algorithm at a LPB of 500.

The respective training curves visually depict Equation 1. In this regard, the respective training curves demonstrate how the model performance accuracy would increase as the number training samples is infinitely increased, wherein the shape of the training curve is determined based on the performance trend information determined by the performance evaluation component 116 as described above. The algorithm entitlement is represented by the area above the training curves where they substantially level out. In this regard, in accordance with Equation 1, assuming an infinite number of training samples, the training curves demonstrates convergence of the machine learning model to a constant Algorithm Entitlement value.

A horizontal line is drawn at a defined point of the performance axis (e.g., the Y-axis) to indicate the MAAP. The intersection points between the training curves and the MAAP line indicate the estimated amount of training data samples needed to achieve the MAAP. For example, box 305 presents an enlarged view of the portion of the graph 300 where the current training sample size intersects with the MAAP line. As shown in box 305, at the current training sample size, training curve 304 (which reflects the current performance of the model/algorithm) is below the MAAP line. The horizontal vector distance from the current training sample size to the intersection point where training curve 304 intersects with the MAAP line corresponds to the number of additional training samples needed to meet the MAAP. In addition, the vertical vector distance from the point wherein the training curve 304 intersects with the current training sample size line to the MAAP line corresponds to the number of additional validation samples needed to meet the MAAP. In this regard, there is uncertainty on the mean value of the performance of the model/algorithm (e.g., reflected by training curve 301). This uncertainty depends on the amount validation data. This effects the estimate of how much data is needed for sufficiency with respect to both validation data and training data.

With reference again to FIG. 1, in various embodiments, the performance evaluation component 116 can also evaluate the performance of the machine learning model $114_1$ using an uncertainty evaluation technique that measure a degree of uncertainty in the performance accuracy of the model. In various embodiments, the performance evaluation component 116 can measure the uncertainty in the performance of the model using a conservative estimate of the certainty of the lower prediction bound (LPB) of the machine learning model $114_1$. For example, the prediction interval can represent the upper and lower bounds for an individual DICE score that will contain a chose fraction of the validation data samples (e.g., 95% of the samples will have a DICE score between 0.81 and 0.99). In other implementations, the performance evaluation component 116 can measure the uncertainty in the performance of the model using based on the lower range of the model confidence interval. For example, the model confidence interval can represent the upper and lower ranges of the mean DICE score of the validation data samples for a chosen confidence (e.g., often 95%).

Figure 4:
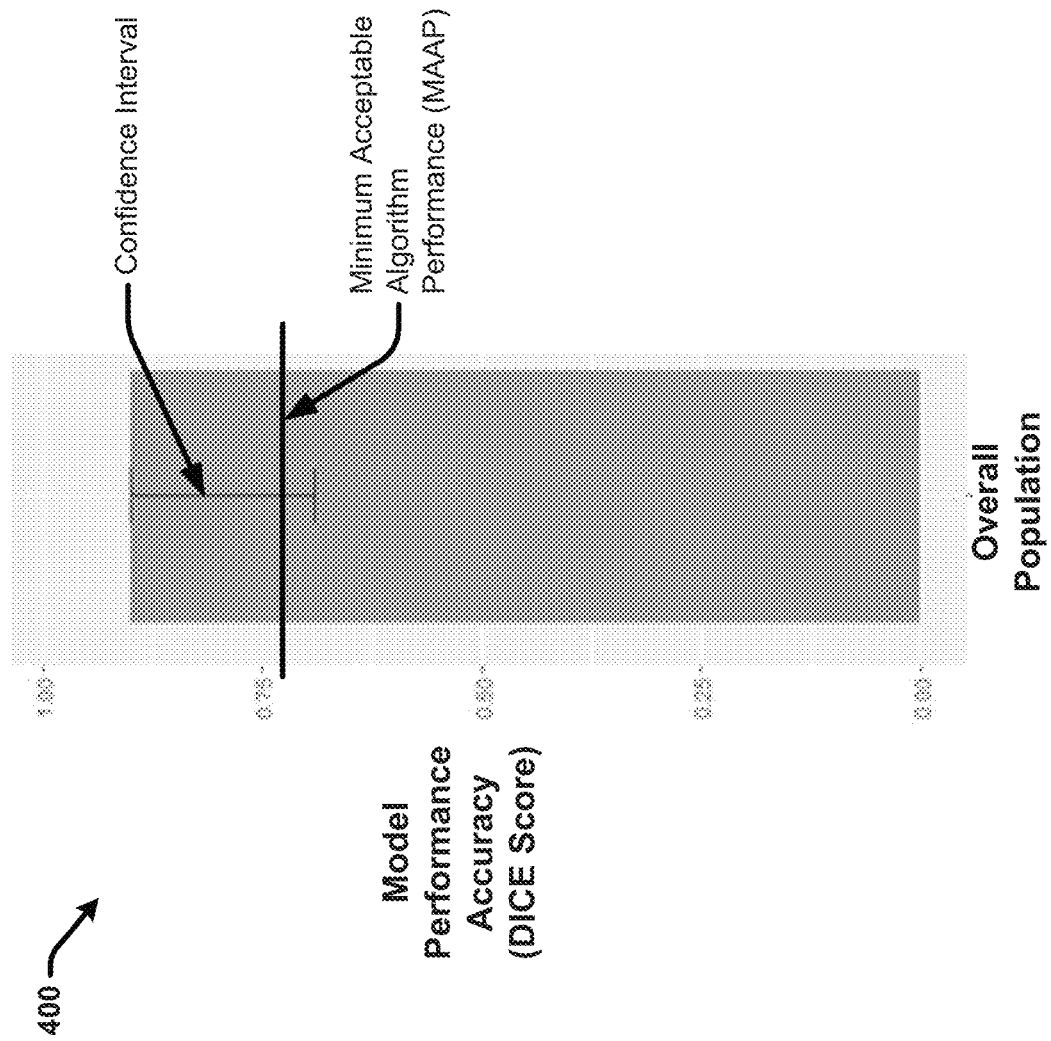
FIG. 4 presents a graph illustrating measures of model performance accuracy and uncertainty relative to the overall population in accordance with one or more embodiments of the disclosed subject matter.

FIG. 4 presents a graph 400 illustrating measures of model performance accuracy and uncertainty relative to the overall population in accordance with one or more embodiments of the disclosed subject matter. In the embodiment shown, the overall model performance accuracy is illustrated as a function of the overall/average DICE score of the model relative to all validation data samples. For instance, in this example, the average DICE score is about 0.75. The graph 400 further illustrates a calculated confidence interval quantification of uncertainty. For example, the confidence interval can include a binomial confidence interval for pass/fail data, and a mean confidence interval for continuous data. In various embodiments, the model development module 106 is only concerned with the lower bound for purposes of performance evaluation. In this regard, as discussed in greater detail with reference to the approval regulation component 120, in various embodiments, a MAAP threshold can be applied for the lower bound of the confidence interval (or the LPB when the prediction bound is used) as a benchmark for determining regulatory approval.

With reference again to FIG. 1, up to this point, the techniques for evaluating the performance of the machine learning model $114_1$ have been directed to evaluating the performance of the model as whole with respect to the overall population. However, in various embodiments, the performance evaluation process can involves measuring the overall model performance (e.g., relative to the whole population of data samples), as well as measuring the model performance of the model with respect to subgroups of the data samples respectively representative of different subgroups of the population. In this regard, the different subgroups can respectively be associated with different, measurable factors associated with the data samples (e.g., the training, test and validation data samples). The level of granularity of the different subgroups can vary. In this regard, the number of factors used to distinguish a subgroup can vary. For example, the different subgroups can include 1-way factor subgroups, 2-way factors subgroups, 3-way factor subgroups and so on. In one or more embodiments, analysis of the performance of the machine learning model $114_1$ with respect to population subgroups is referred to herein as subgroup sufficiency analysis.

The goal of subgroup sufficiency analysis is to estimate the performance of the machine learning model $114_1$ for all (or in some implementations one or more) subgroups in the population that may be attributed to variance in the performance of the model. In a regulatory application, the intended population and any excluded subgroups of the population that the device does not have satisfactory performance for must be clearly stated. For healthcare AI algorithms regulators expect that a diligent effort will be made by the developers to identify these underperforming subgroups. If the algorithm's performance for a subgroup is below the MAAP threshold this indicates that the algorithm is not suitable for that subpopulation and should be listed in the exclusion criteria.

In various embodiments, the process to demonstrate sufficient subgroup performance can involve identifying the subgroups, apply all samples in the validation set to the trained machine learning model $114_1$, generate inferences, and determine and measure the accuracy and/or uncertainty of the model with respect to its performance on each subgroup using an appropriate metric. For example, in one or more embodiments, the performance evaluation component 116 can calculate both the average performance accuracy of the model on each subgroup (e.g., using a DICE score) and the associated group uncertainty to estimate the LPB for each subgroup. The approval regulation component 120, then compare the LPBs for each subgroup to a defined MAAP threshold for the LPBs (e.g., a minimum LPB value) to see if any subgroups need to be excluded.

Figure 5:
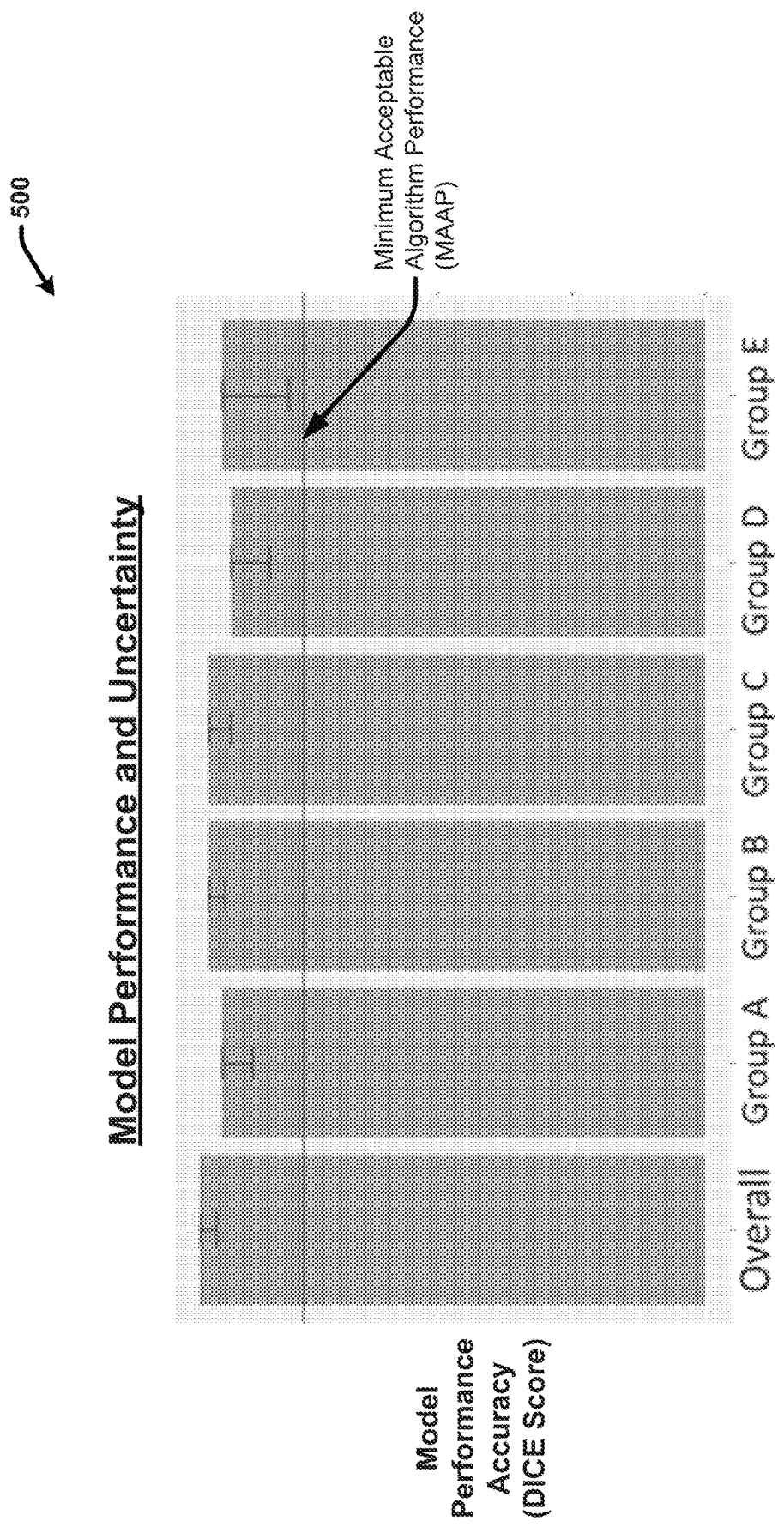
FIG. 5 presents an example graph illustrating the measures of model performance and uncertainty relative to the overall population and relevant subgroups in accordance with one or more embodiments of the disclosed subject matter.

For example, FIG. 5 presents an example graph 500 illustrating the measures of model performance and uncertainty relative to the overall population and relevant subgroups in accordance with one or more embodiments of the disclosed subject matter. Graph 500 depicts same or similar information as graph 400 with the addition of the subgroup sufficiency analysis. The respective subgroups are generally identified as groups A-E. In the embodiment shown, the lower confidence interval or LPB for each of the subgroups is above the MAAP threshold, indicating that the performance of the model is sufficient for regulatory approval on all subgroups.

With reference again to FIG. 1, in some embodiments, the the criteria used to define the subgroups can be predefined based on one or more measurable factors (e.g., diagnosis codes, demographics, image acquisition parameters, etc.) that may be a source a variance in the performance of the model (e.g., based on domain knowledge, clinical expertise, etc.). For example, in implementations in which the data samples comprise medical images, the different subgroups of the medical images can be based on different image-based factors (e.g., acquisition device modality, vendor, model, protocol, exam type, image artifacts, contrast, sharpness, noise, etc.) and/or clinical factors (e.g., diagnosis, procedure, implants, patient demographics, etc.).

In other implementations, the disclosed techniques can employ an automated data driven process to group the data samples into subgroups. With these embodiments, the model development module 106 can include grouping component 118 to facilitate automatically identifying or generating relevant subgroups to the performance evaluation and/or the approval regulation process of the machine learning model $114_1$. For example, in various embodiments, the grouping component 118 can identify potential relevant grouping factors for the subgroups in metadata associated with the respective data samples (e.g., the training data samples and/or the validation data samples). In other embodiments, the grouping can identify potential relevant grouping factors for the subgroups in auxiliary data associated with the respective samples, data provided in exam reports (e.g., radiology reports), clinical notes, administrative data, and the like. With these embodiments, the grouping component 118 can employ natural language processing techniques to automatically identify and extract the grouping factors.

For example, in implementations in which data samples comprise medical images, the medical images can be associated with related, non-image-based, clinical information for the respective images that can facilitate automatically identifying relevant subgroups. For instance, the related, non-image-based clinical information can include information that identifies or indicates a diagnosis reflected in the medical image taken from text and/or audio data sources associated with the medical image, such as but not limited to: radiology reports, clinical notes, pathology reports, clinical dictations, physician's orders, laboratory reports, pathology reports, electronic medical records (EMR) for the patient from which the image was taken, and the like. For example, the non-image-based clinical information can include diagnosis (DX) codes, current procedural terminology (CPT) codes, prescription (Rx) codes, International Classification of Disease (ICD) codes, relative value unit (RVU) codes, and the like. In another example, the non-image-based clinical information can include relevant clinical terms or phrases that identify or indicate a diagnosis reflected in the medical image extracted from clinical notes and/or reports using natural language processing (NLP) techniques. The medical images can also be associated with additional, non-clinical information that can may be correlated to variances in model performance and thus identified as potential subgroup grouping factors. For example, in some implementations, the non-clinical information associated with an unannotated medical image can include attributes regarding the patient from which the medical image was taken (e.g., patient medical history, patient comorbidity, patient demographics such as age, gender, location, height, weight, etc.), the image acquisition device (type, make, model, resolution, etc.), the image source (e.g., institution, geographic region, etc.), and the like, that can be correlated to variances in the performance of the diagnostic model.

In some implementations, the grouping comping component can employ a DenialsIQ algorithm to generate a plurality of potential subgroups that include of different degrees of granularity (e.g., 1-way subgroups, 2-way subgroups, n-way subgroups, etc.). In other embodiments, the grouping component 118 can employ automated clustering/grouping algorithms (e.g., k-means, mean-shift, Expectation-Maximization (EM) Clustering using Gaussian Mixture Models (GMM), Agglomerative Hierarchical Clustering or the like) and/or other type of supervised and unsupervised machine learning to facilitate identifying the and generating the relevant subgroups based on identified distinguishing features associated with different subgroups of the data samples. The grouping component 118 can further direct the performance evaluation component to calculate subgroups performance measures (e.g., DICE scores and/or LPB values) for all the potential subgroups. The grouping component 118 can further identify the relevant subgroups from the potential subgroups based on their performance measurements and the number of samples included in each subgroup. In some implementations, the grouping component 118 can employ a minimum number of samples to constitute a subgroup to minimize outliers. With these embodiments, the grouping component 118 can provided for automatically identifying meaningful subgroups and evaluating the model performance relative to the subgroups in addition to the performance model as a whole.

The model development module 106 can further include an approval regulation component 120 to facilitate evaluating the results of the performance evaluation component 116 in association with defined regulatory approval rules and requirements for the particular machine learning model $114_1$ to facilitate determining and/or recommending whether to approve the machine learning model $114_1$ for deployment in the field. In this regard, the approval regulation component 120 can evaluate the performance of the model as a whole and with respect to the individual subgroups based on the results of the respective results of performance evaluation component 116 and defined acceptability criteria regarding the relevant MAAP thresholds required to determine whether to approve or disapprove the model. For example, in various embodiments, the approval regulation component 120 can determine whether to approve the model for deployment based on whether the accuracy performance measures (e.g., DICE scores) satisfy a defined accuracy threshold, and/or whether the uncertainty measures (e.g., lower confidence interval and/or LPB) satisfy a defined uncertainty measure threshold. For example, in some implementations, the approval regulation component can approve the model if the LPB values for the model performance overall and each of the subgroups are above a minimum LPB value threshold. According to this example, if any of the LPB values (for the model overall and any of the subgroups is below the minimum LPB threshold value, the approval regulation component 120 can be configured to disapprove the model. In other embodiments, rather than disapproving the entire model, the approval regulation component 120 can approval the model with exclusions for use against any of the identified underperforming subgroups.

In some embodiments, the approval regulation component can also employ data sufficiency/algorithm entitlement results in association with determining whether to approve the model for deployment. For example, the approval regulation component 120 can determine whether to approve or deny the model for deployment based on whether a sufficient amount of training data has been used to train the model and/or validate the performance of the model as determined based on an a defined MAAP threshold for the level of accuracy required to be achieved. In this regard, the approval regulation component 120 can employ the algorithm entitlement analysis to determine whether the current amount of training data samples results in a training curve that is above the MAAP line. This can be computed for each subgroup. In some implementations in which the training curve is below the MAAP line at the current sample size (e.g., training curve 304 with reference to FIG. 3), the approval regulation component 120 can employ the algorithm entitlement equation to determine the number of additional training cases and/or validation cases needed to achieve MAAP (for each subgroup and/or with respect to the model as a whole). In another example, the approval regulation component 120 can determine whether a sufficient amount of training data has been used to train the model based on an expected degree of increase in the performance of the model if additional training samples were to be applied. For example, if the addition of over N number of training data samples will have less than an X % degree of change in the performance of the model, the approval regulation component 120 can consider the model to pass a defined sufficiency requirement.

In various additional embodiments, the approval regulation component can further employ a variety of additional measurable criteria to facilitate determining whether to approve or disapprove a machine learning model for deployment in a particular use case. In particular, the amount of data needed to train an algorithm and the threshold for the MAAP performance metrics needed for regulatory approval of machine learning models that classify as SaMD can depend on multiple regulatory factors relevant to the purpose of the model and the context in which the model will be used in the field. For example, with respect to medical AI algorithms, the level of performance accuracy of the model required (e.g., the MAAP thresholds) and the number of training data samples used to demonstrate achievement of that level of performance accuracy can vary based on vary based on a valuation of risks associated with incorrect inferences and costs associated with withholding usage of the model in scenarios where more harm the gain would be achieve by withholding the model from deployment even with a less than ideal demonstrated performance level). In this regard, the risk verses benefit analysis will be different for each algorithm and use case. The current "minimum" performance standard that the FDA applies for medical algorithm performance assuming are based on subjective measures of improvement in patient care. In addition, the current regulatory bodies do not provide any objective standards with respect determining how factors regarding clinical need, risks and benefits impact the process of regulatory approval. This lack of standardization and measurable approval criteria has resulted in substantial delays to in the AI algorithm development and regulatory approval process.

In one or more embodiments, to facilitate a more objective and structured evaluation of model performance for regulatory approval, the MAAP thresholds for medical AI models based with respect to algorithm entitlement and other performance evaluation metrics described herein be based a variety of measurable criteria respectively grouped into the following categories: 1. Clinical need and severity; 2; Risks and mitigation; 3. Benefits; and 4. Accepted performance level of a comparable entity. The criteria described with reference to one or more of these categories can also be applied to objectively determining the MAAP thresholds for performance evaluation for and various machine learning models used outside the medical domain. In some embodiments, the MAAP thresholds determined based on the above noted criteria can be predefined. In other embodiments, the approval regulation component 120 can employ various machine learning techniques and/or heuristic based techniques to calculate the MAAP thresholds for a given algorithm and use case based on scoring and evaluating the criterial included in the above four categories. The approval regulation component 120 can further employ measurable scores and/or values determined for the parameters included in the above four categories as additional criteria/benchmarks for determine whether to approve the model and/or whether sufficient training data has been used.

In this regard, the first category, clinical need and severity, is a key driver for the scrutiny and expectations for the performance and robustness of an AI algorithm depending on the reason the AI algorithm is being used and severity of clinical situation. For example, as the clinical need for the algorithm increases and the severity of the clinical situation increases, the MAAP standards for the AI model may be lowered. In various embodiments, the clinical need and severity of a medical AI algorithm can be based on a defined severity classification scheme that classifies or scores the algorithm with a defined severity level based on objective criteria. For example, in some embodiments, the classification used here can be the three-level classification system provided by the International Medical Device Regulators Forum (IMDRF) and the FDA, which classifies medical device software (SaMD) as either critical, serious, to non-serious.

The second category, risks and mitigation, can in involve identifying and quantify risks involved in usage of a SaDM while also considering measures that are available to reduce these risks. In general, the higher the risks, the higher the MAAP thresholds should be. In this regard, there are multiple ways that the AI algorithm and the system it is used can fail. Since regulators are the sole gatekeeper to prevent harmful medical products from entering the market a patient centered risk evaluation expected. Mitigations are steps that are taken to reduce the likelihood or severity of the occurrence of a risk. In various embodiments, MAAP thresholds for regulatory approval of SaDMs can be based on one or more risk/mitigation valuations that measure of or more of the following: algorithmic risk, contribution to care, risk timeliness, and ability to detect and mitigate (e.g., respond to system error. In this regard, the algorithmic risk can measure risk of patient harm based on algorithm error, such as an incorrect prediction from ground truth or another algorithm prediction error.

The contribution to care criteria can reflect a risk verses reward valuation. In this regard, the amount of information an algorithm contributes to a diagnosis can range from minimal to complete automated diagnosis. In IMDRF/FDA terminology, the contribution levels can be based on whether and what degree the SaDM informs clinical management, drive clinical management, and/or diagnoses or treat a patient.

For example, FIG. 6, presents a table 600 outlining the IMDRF/FDA SaMD risk stratification based on significance of information and clinical severity. The four categories (I, II, III and IV) are based on the levels of impact on the patient or public health where accurate information provided by the SaMD to treat or diagnose and drive or inform clinical management is vital to avoid death, long-term disability or other serious deterioration of health, mitigating public health. As shown in table 600, the "inform clinical management" criteria carries the lowest risk since it is only one piece of information used by the clinician, while the diagnose or treat criteria carries the highest risk since it is making a prediction about the disease, the severity or treatment plan. In various embodiments, the combination of the classified risk level (critical, serious, or non-serious) as well as the scores of I, II, III or IV received in each of the significance categories can be used to generate a risk score for proposed medical AI software models. This risk score can further be employed to determine one or more MAAP thresholds for evaluating the performance and data sufficiency of the model in accordance with the techniques described herein.

A measure of risk timeliness can reflect the urgency of needed to perform the task the machine learning model is configured to perform. In this regard, the longer the time that a clinician has to observe and correct an error before diagnosis or treatment, the lower the risk. For example, a short time frame would include a heart pacemaker which must respond to an arrhythmia within seconds without consulting a doctor to prevent irreversible harm. Whereas, an algorithm that scores a patient's five-year risk for a heart attack and recommends a medication to reduce a patient's cholesterol is lower risk because there are multiple chances for the output of the algorithm to be reviewed and evaluated by a clinician.

Risk detectability and mitigation can account for the ability to respond to system error. In this regard, Detectability is the ability for a clinician to know when an error has occurred in the prediction system. Efforts should be made to understand and document assumptions about use case, the input data, the configuration of the data acquisition system.

The primary mitigation to system errors is the ability for the user or the system to respond to the error and prevent or limit patient harm.

The third category, benefits, is directed to measuring the various benefits that can be provided by the SaMD in the field. In this regard, to achieve regulatory approval an algorithm must be able to demonstrate an improvement to patient care. The larger the total benefits the more likely the algorithm is to get approval. In this regard, in various embodiments, as the benefits increase this can contribute to lowing of one or more MAAPs used to determine model approval. In one or more embodiments, the benefits derived from using an medical AI algorithm can be quantified as either a clinical benefit (e.g., expressed in terms of improved patient outcomes from improved diagnosis or treatment), a workflow efficiency benefit (e.g., expressed in terms of reduced processing time, time to receive treatment, the ability to deliver a decision when no clinician is available (such as a remote setting), etc.), and/or an immediacy of clinical response benefit. The immediacy of clinical response benefit can be included in a regulatory submission when the time and/or impact on care is it is able to be quantified. One example of condition with high immediate benefit is an implanted heart pacemaker which must respond to an arrhythmia in a fraction of a second. Because the signal processing algorithm is performing a task that no clinician could be expected to perform it is held to a lower standard than the same algorithm in a high-acuity ICU setting with active clinician monitoring.

The fourth category, the accepted performance level of a comparable entity, is based on setting MAAP thresholds based on the level of performance of a comparable human or predicate device that currently performs and/or will perform the task in the real-world environment. For example, with respect to a clinical task currently being performed by clinicians in the medical field, the MAAP thresholds of a machine learning model trained to perform the same clinical task can be based on the average performance of the clinicians. In this case, the comparable entity would account for the type and skill level of the relevant clinicians performing the tasks, which can vary based on the task. For example, the comparable clinician could include a nurse, a physician's assistant resident, physician, specialist, board of specialists, and the like. In other implementations, when a new algorithm or system is seeking approval to replace an already approved algorithm or system (the predicate device), it will need to offer some additional clinical benefit. In this case, the performance of the predicate device can be used to set the threshold for MAAP.

With reference again to FIG. 1, in various embodiments, the output of the model development module 106 can include the performance evaluation results 124 (e.g., provided by the performance evaluation component 116), the approval results 126 (e.g., regarding whether the model was approved or disapproved and why) with any approval restrictions regarding restricted subgroups that the model should not be used on in the field, and the developed and trained machine learning model $114_1$.

Figure 7:
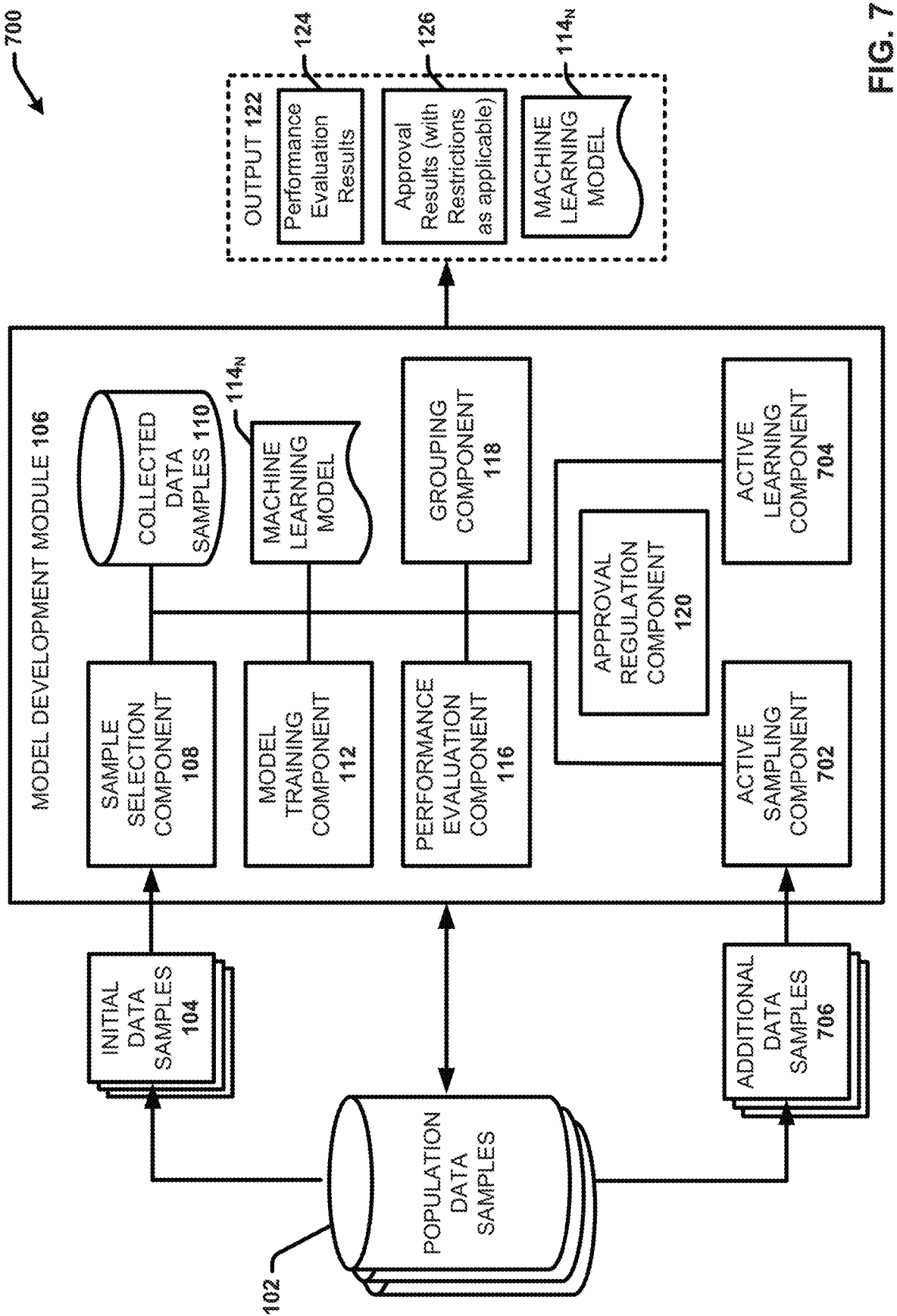
FIG. 7 illustrates a block diagram of another example, non-limiting system that provides machine learning model development and optimization tools to ensure performance validation and data sufficiency for regulatory approval in accordance with one or more embodiments of the disclosed subject matter.

FIG. 7 illustrates a block diagram of another example, non-limiting system 700 that provides machine learning model development and optimization tools to ensure performance validation and data sufficiency for regulatory approval in accordance with one or more embodiments of the disclosed subject matter. System 600 includes same or similar features and functionalities as system 100 with the addition of active sampling component 702, active learning component 704, and additional data samples 706. Repetitive description of like elements employed in respective embodiments is omitted for sake of brevity.

In various embodiments, that active learning component 704 and the active sampling component 702 can facilitate an automated active learning and model optimization process based on the identification of underperforming subgroups. With these embodiments, the active learning component 704 can be configured to identify underperforming subgroups based on the subgroup performance scores associated with the underperforming subgroups failing to satisfy the threshold subgroup performance measure. For example, the active learning component 704 can be configured to identify underperforming subgroups based on their performance measures (e.g., uncertainty values) falling below the defined MAAP threshold value for the subgroups. For instance, the active learning component 704 can identify underperforming subgroups based on the average performance accuracy measures (e.g., DICE values) associated with the subgroups falling to satisfy a threshold performance accuracy measure. In another example, the active learning component 704 can identify underperforming subgroups based on lower bound of the uncertainty measures associated with the underperforming subgroups failing to exceed a minimum lower prediction bound threshold.

The active sampling component 702 can further perform an active sampling process to retrieve additional data samples for further training, updating and validating the machine learning model to improve the accuracy of the model and/or the uncertainty in the accuracy. In this regard, the active sampling component 702 can retrieve additional data samples 706 for the underperforming subgroups from a collection of population data samples for the sample population. For example, the active sampling component 702 can automatically identify additional data samples 706 for the underperforming subgroups as included in the one or more population data samples databases 102 based on metadata associated with the data samples identifying the relevant distinguishing factors, based on extracting the factors from radiology reports associated with the data samples using NLP, and the like. The active sampling component 702 can further retrieve the additional data samples 706 for continued model training and development and add the additional data samples 706 to the collected data samples 110. In various embodiments, the additional data samples 706 can be added to the training data set and the test dataset and used for further training/updating of the machine learning model. In other embodiments, the additional data samples 706 can be added to the validation dataset and/or the regulatory validation dataset for further validating the performance of the model. Still in other embodiments, the additional data samples 706 can be distributed between the training dataset, the test dataset, the validation dataset and the regulatory validation dataset.

In some embodiments, the active sampling 702 component can evaluate potential new data samples based on a degree to which the potential new data samples will contribute to optimizing the performance accuracy of the machine learning model and select the additional data samples from the potential new data samples based on the evaluating. In this regard, the active sampling component 702 can discriminatorily identify and select the "higher priority" additional data samples for retrieving for continued model training and optimization, wherein the higher priority data samples are estimated to provide a stronger contribution to improving the performance of the model relative to lower priority samples. As a result, the active sampling process can minimize costs and waste associated with retrieving and training the model on data samples that will not significantly increase the performance of the model. For example, in some implementations of these embodiments, the active sampling component 702 can determine priority scores for potential new data samples based on the subgroup performance scores of the underperforming subgroups that the potential new data samples respectively belong and select the additional data samples from the potential new data samples based on the priority scores.

In another embodiment, the active sampling component 702 can determine a difficulty score for the underperforming subgroups and select the additional data samples that maximize a change to the difficulty score (e.g., choose new samples to maximize the change in the difficulty score, which should make the largest improvement in the model). According to this example implementation, the active sampling component 702 can calculate the difficulty score for each underperforming subgroup using Equation 2 or Equation 3 below:

Difficulty Score=derivative of the mean(DICE)/derivative of the sample count    Equation 2.

Difficulty Score=derivative of the LPB(DICE)/derivative of the sample count    Equation 3.

In accordance with this embodiment, the active sampling component 702 can select "best" additional data samples 706 that achieve one or more optimization goals. For example, the active sampling component 702 can select the additional data samples 706 that optimize AUC for a prescribed budget. In another example, the active sampling component 702 can select the additional data samples 706 that optimize sensitivity for a given specificity for a prescribed budget. In another example, the active sampling component 702 can select the additional data samples 706 that maximizes the minimum prediction bound for all subgroups for a prescribed budget. In another example, the active sampling component 702 can select the additional data samples 706 that minimize the upper bound on model test error across the subgroups. In some implementations, to optimize a level one sub-group, the active sampling component 702 can find the interactions at the next level down and calculate the difficulty score. For each potential new training exam, the active sampling component 702 can then score it against the expected improvement. The active sampling component can then sort the potential new training exams, score the exams, and choose the top-scoring exams.

Furthermore, in some embodiments, the active sampling component 702 can determine an amount of the additional data samples to retrieve using the results of the entitlement function. For example, in some embodiments, the active sampling component 702 can use the overall entitlement evaluation to determine the number of additional traning data samples and/or validation data samples that are expected to be needed to achieve the overall MAAP entitlement threshold for the model. The active sampling component 702 can then limit the amount of additional data samples 706 retrieved based on the number of additional data samples needed to satisfy the entitlement MAAP criteria. The active sampling component 702 can also look at the underperforming subgroups and their associated difficulty scores to determine how to allocate the number of additional training data samples and/or validation data samples needed across the underperforming subgroups. For example, the active sampling component 702 can allocate a greater number of additional data samples to the lowest-performing subgroups relative to the subgroups that are just slightly under the minimum MAAP threshold.

The model training component 112 can further update the machine learning model $114_1$ using the additional data samples 706, resulting in an updated machine learning model $114_N$. The performance evaluation component 116 can further update the subgroup performance measures based on the performance accuracy of the updated machine learning model with respect to the underperforming subgroups. The active sampling component 702 can further continue to retrieve the additional data samples and the model training component 112 can continue to train and update the machine learning model $114_N$ using the additional data samples until all of the subgroup performance measures respectively satisfy the threshold subgroup performance measure or maximum amount of the additional data samples authorized for retrieval has been reached. In this regard, the active learning process, including the retrieving of the additional data samples and the updating of the machine learning model using the additional data samples can continue until the desired level of performance of the model on overall and/or with respect to the subgroups is reached, or a cap on model development has been reached (e.g., regarding a maximum amount of the additional data samples authorized for retrieval, a monetary cap, a time cap, etc.). This active learning process can also be employed after model deployment to continue improving and updating the model based on new training data and performance of the model in the field, providing a more efference and more objective mechanism for achieving software updates for SaMD.

Figure 8:
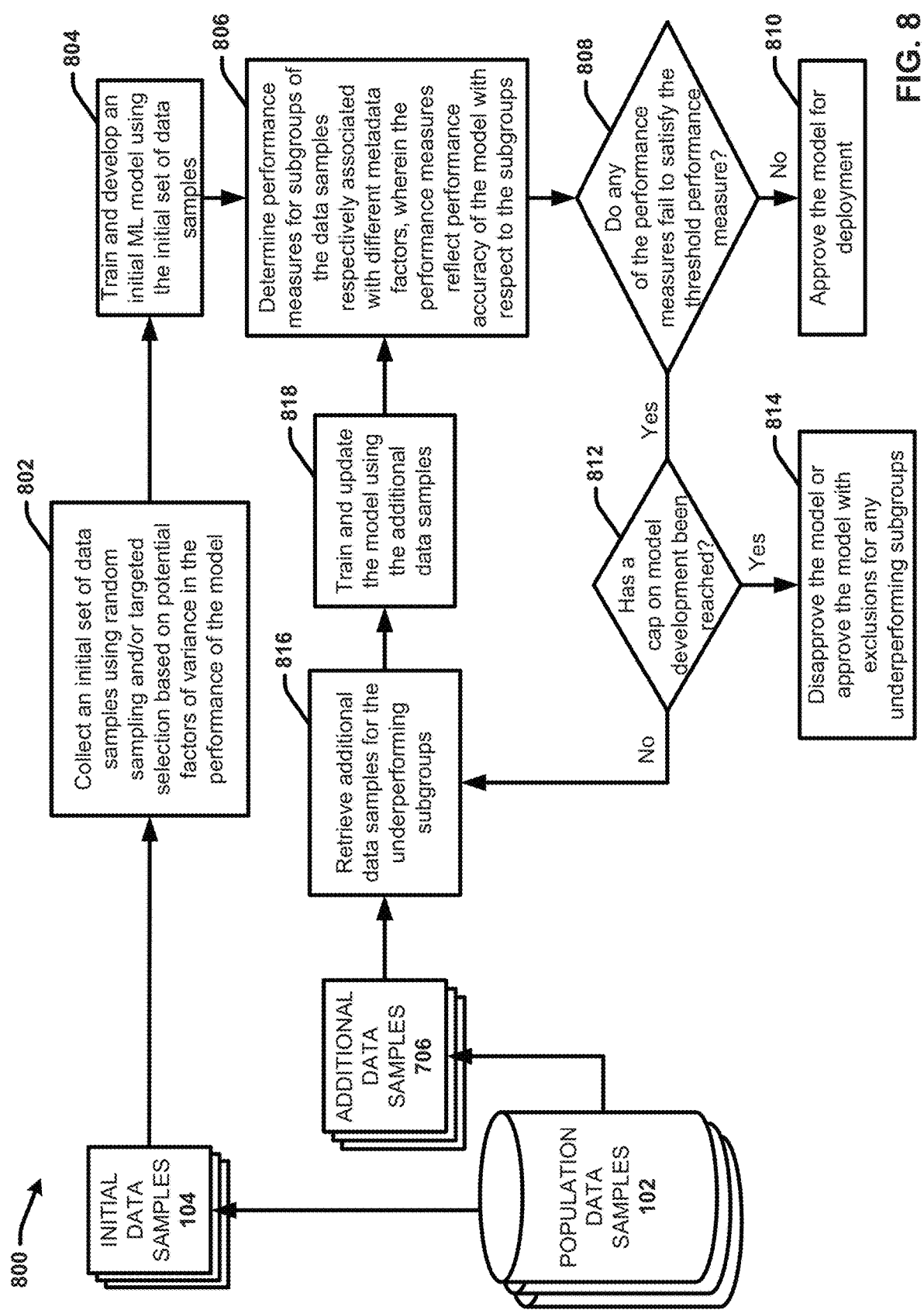
FIG. 8 provides a flow diagram of an example, non-limiting computer-implemented method for machine learning model development and optimization that ensures performance validation and data sufficiency for regulatory approval in accordance with one or more embodiments of the disclosed subject matter.

FIG. 8 provides a flow diagram of an example, non-limiting computer-implemented method 800 for machine learning model development and optimization that ensures performance validation and data sufficiency for regulatory approval in accordance with one or more embodiments of the disclosed subject matter. In various embodiments, method 800 demonstrates the active learning process that can be performed by system 700 using the active learning component 704, the active sampling component 702 and the additional data samples 706. Repetitive description of like elements employed in respective embodiments is omitted for sake of brevity.

At 802, the system can collect an initial set of data samples (e.g., initial data samples 104) using random sampling and/or targeted selection based on potential factors of variance in the performance of the model (e.g., via sample selection component 108). At 804, the system can then train and develop an initial ML model (e.g., machine learning model $114_1$) using the initial set of data samples (e.g., using model training component 112). At 806, the system can further determine performance measures for subgroups of the data samples respectively associated with different metadata factors (e.g., via the performance evaluation component 116), wherein the performance measures reflect performance accuracy of the model with respect to the subgroups (e.g., DICE scores, LPB values, etc.). At 808, the system can determine (e.g., using approval regulation component 120) whether any of the performance measures fail to satisfy the defined threshold performance measures (e.g., the defined MAAP threshold for the subgroups). If not, the system can approve the model at 810 (e.g., using approval regulation component 120).

If at 808, the approval regulation component 120 determines that one or more of the performance measures fail to satisfy the threshold, at 812, the system can determine (e.g., via the active learning component 704) whether a cap on model development has been reached (e.g., a monetary cap, a maximum number of samples cap, a time cap, etc.). If so, then at 814, the system can disapprove the model or approve the model with usage exclusions for any of the underperforming subgroups.

However, if at 812 the system determines that a cap on model development has not been reached (or one has not been set), then at 816, the system can retrieve additional data samples 706 for the underperforming subgroups (e.g., via the active sampling component 702). At 818, the system can further train and update the model (e.g., via the model training component 112) using the additional samples at 706, resulting in an updated model (e.g., (e.g., machine learning model 114$_N$). The system can further reevaluate the subgroup sufficiency at 806 after training and updating the model using the additional data samples, and re-evaluate whether to approve or disapprove the model in accordance with steps 808 and 812 accordingly. In this regard, process 800 can continue with the active sampling, and model updating steps (816 and 818) until the answer to the question at 808 is no, or the answer to the question at 812 is yes.

Figure 9:
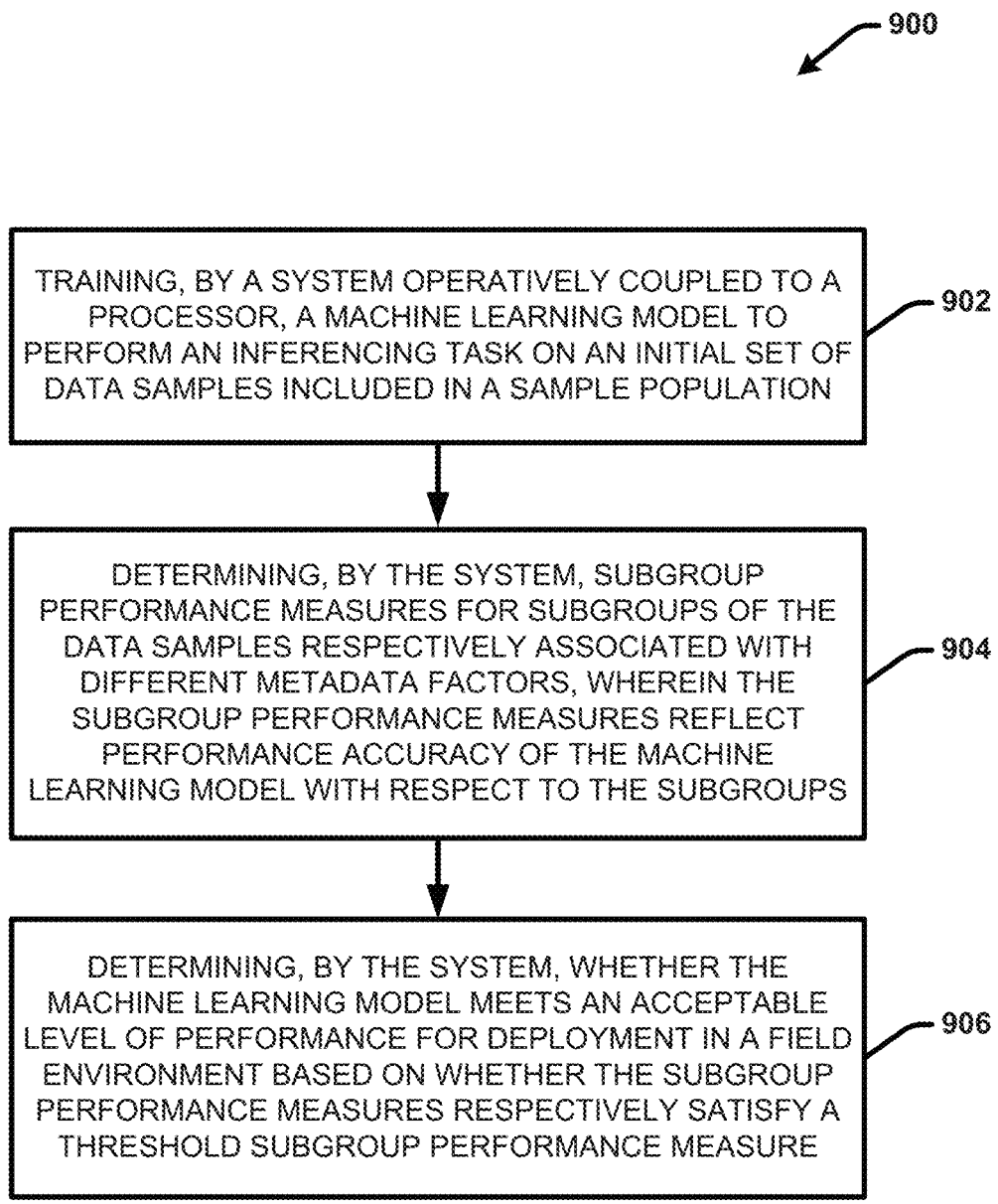
FIG. 9 provides a flow diagram of another example, non-limiting computer-implemented method for machine learning model development and optimization that ensures performance validation and data sufficiency for regulatory approval in accordance with one or more embodiments of the disclosed subject matter.

FIG. 9 provides a flow diagram of another example, non-limiting computer-implemented method 900 for machine learning model development and optimization that ensures performance validation and data sufficiency for regulatory approval in accordance with one or more embodiments of the disclosed subject matter. Repetitive description of like elements employed in respective embodiments is omitted for sake of brevity.

At 902, a system operatively coupled to a processor (e.g., system 100, system 700 or the like), trains (e.g., using model training component 112) a machine learning model (e.g., machine learning model 114$_1$) to perform an inferencing task on an initial set of data samples (e.g., initial data samples 104) included in a sample population (e.g., population data samples 102). At 904, the system determines subgroup performance measures (e.g., DICE scores, LPB values, lower confidence interval values, etc.) for subgroups of the data samples respectively associated with different metadata factors (e.g., using performance evaluation component 116), wherein the subgroup performance measures reflect performance accuracy of the machine learning model with respect to the subgroups. At 906, the system determines (e.g., using approval regulation component 120) whether the machine learning model meets an acceptable level of performance for deployment in a field environment based on whether the subgroup performance measures respectively satisfy a threshold subgroup performance measure (e.g., a defined MAAP threshold for the subgroups).

Figure 10:
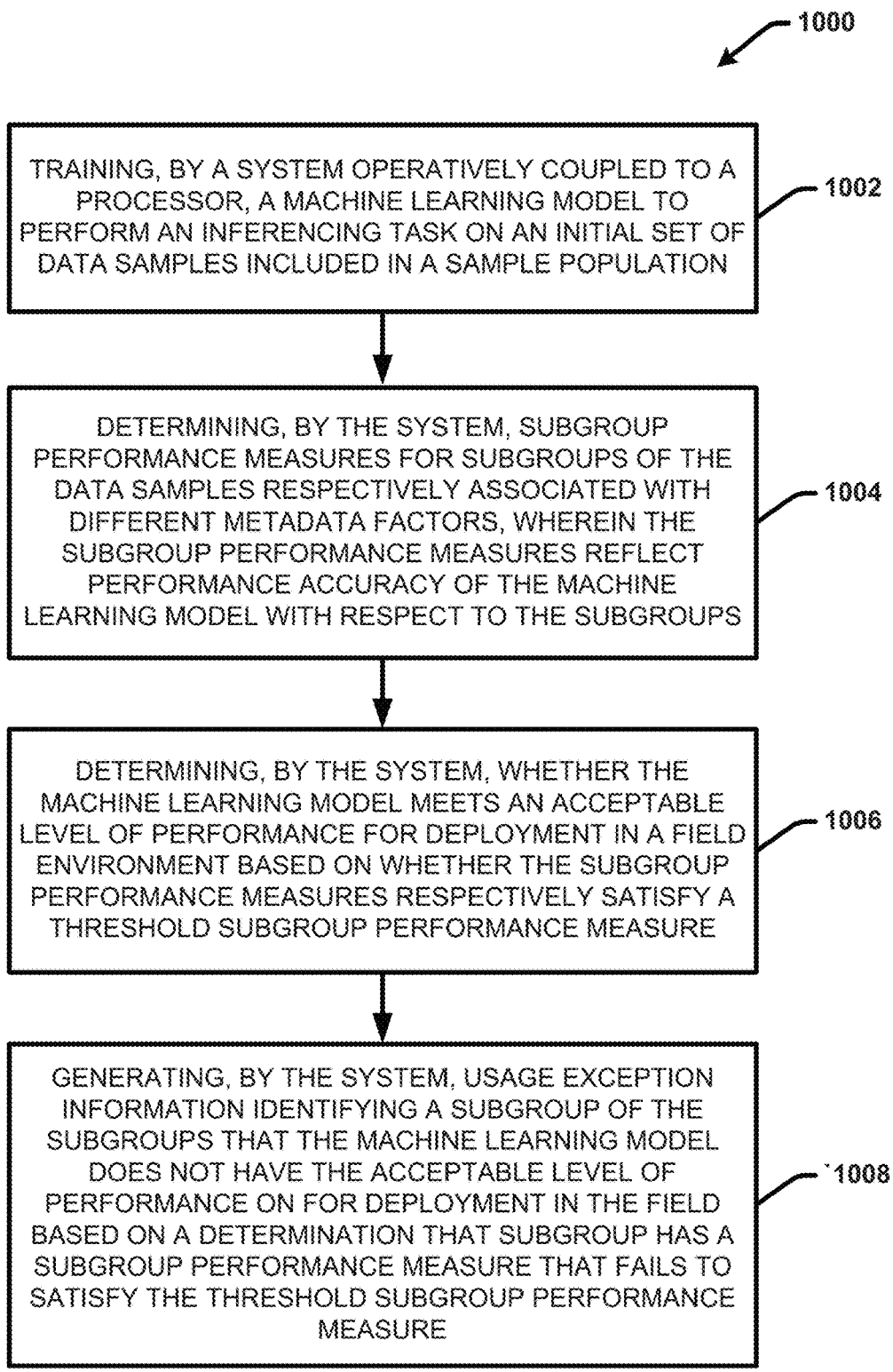
FIG. 10 provides a flow diagram of another example, non-limiting computer-implemented method for machine learning model development and optimization that ensures performance validation and data sufficiency for regulatory approval in accordance with one or more embodiments of the disclosed subject matter.

FIG. 10 provides a flow diagram of another example, non-limiting computer-implemented method 1000 for machine learning model development and optimization that ensures performance validation and data sufficiency for regulatory approval in accordance with one or more embodiments of the disclosed subject matter. Repetitive description of like elements employed in respective embodiments is omitted for sake of brevity.

Figure 11:
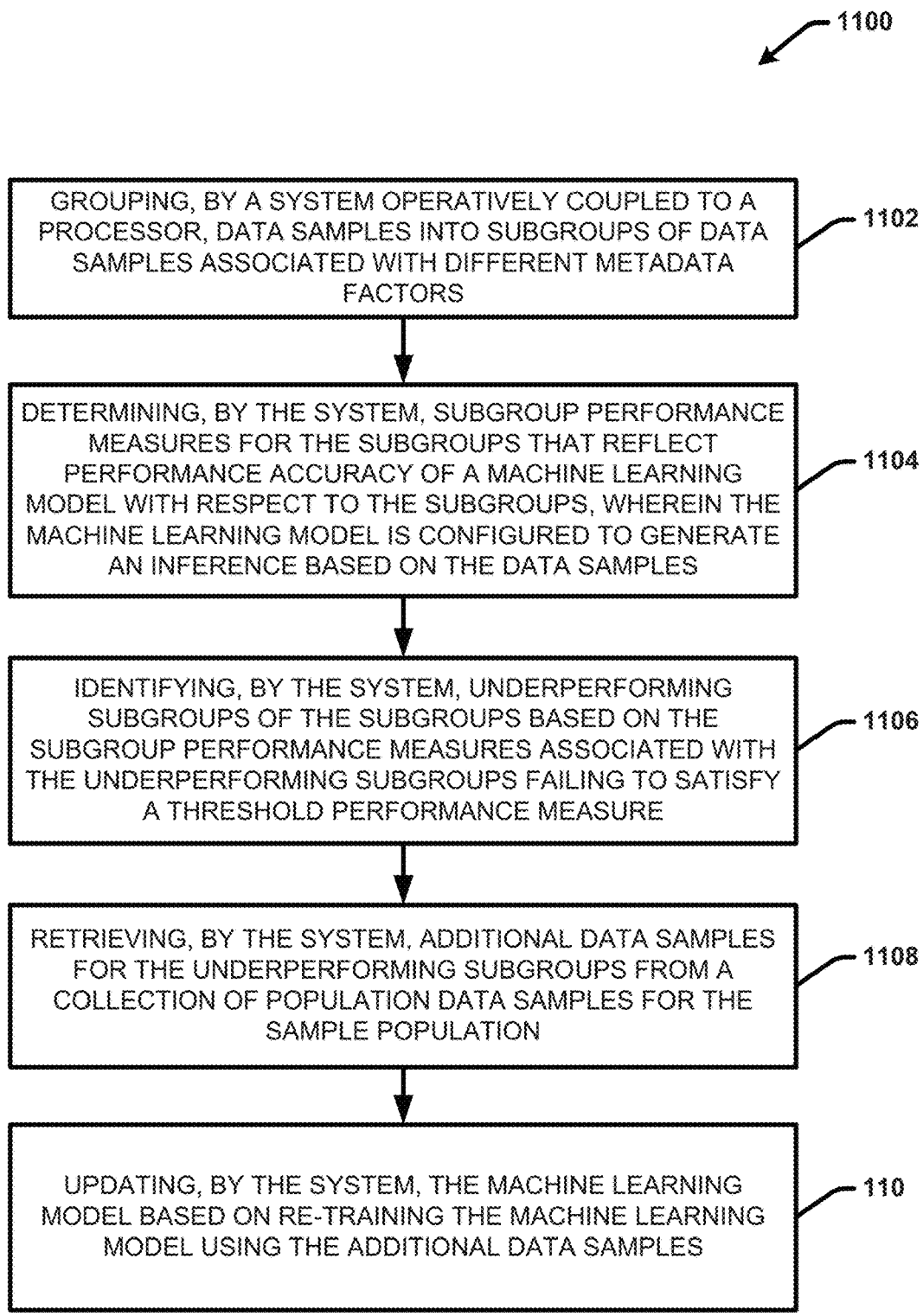
FIG. 11 provides a flow diagram of another example, non-limiting computer-implemented method for machine learning model development and optimization that ensures performance validation and data sufficiency for regulatory approval in accordance with one or more embodiments of the disclosed subject matter.

At 1002, a system operatively coupled to a processor (e.g., system 100, system 700 or the like), trains (e.g., using model training component 112) a machine learning model (e.g., machine learning model 114$_1$) to perform an inferencing task on an initial set of data samples (e.g., initial data samples 104) included in a sample population (e.g., population data samples 102). At 1004, the system determines subgroup performance measures (e.g., DICE scores, LPB values, lower confidence interval values, etc.) for subgroups of the data samples respectively associated with different metadata factors (e.g., using performance evaluation component 116), wherein the subgroup performance measures reflect performance accuracy of the machine learning model with respect to the subgroups. At 1006, the system determines (e.g., using approval regulation component 120) whether the machine learning model meets an acceptable level of performance for deployment in a field environment based on whether the subgroup performance measures respectively satisfy a threshold subgroup performance measure (e.g., a defined MAAP threshold for the subgroups). At 1008, the system generates usage generates usage exception information (e.g., by the approval regulation component 120) identifying a subgroup of the subgroups that the machine learning model does not have the acceptable level of performance on for deployment in the field based on a determination that subgroup has a subgroup performance measure that fails to satisfy the threshold subgroup performance measure FIG. 11 provides a flow diagram of another example, non-limiting computer-implemented method 1100 for machine learning model development and optimization that ensures performance validation and data sufficiency for regulatory approval in accordance with one or more embodiments of the disclosed subject matter. Repetitive description of like elements employed in respective embodiments is omitted for sake of brevity.

At 1102, a system operatively coupled to a processor (e.g., system 100, system 700 or the like), groups subgroups of data samples associated with different metadata factors (e.g., using grouping component 118). At 1104, the system determines subgroup performance measures (e.g., DICE scores, LPB values, lower confidence interval values, etc.) for the subgroups of the data samples that reflect performance accuracy of the machine learning model with respect to the subgroups (e.g., using performance evaluation component 116), wherein the machine learning model is configured to generate an inference based on the data samples. At 1106, the system determines underperforming subgroups of the subgroups based on the subgroup performance measures associated with the underperforming subgroups failing to satisfy a threshold performance measure (e.g., using the approval regulation component 120 and/or the active learning component 704). At 1108, the system retrieves additional data samples for the underperforming subgroups from a collection of population data samples for the sample population (e.g., using the active sampling component 702). At 1110, the system updates the machine learning model based on re-training the machine learning model using the additional data samples (e.g., using the model training component 112).

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 12, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 12:
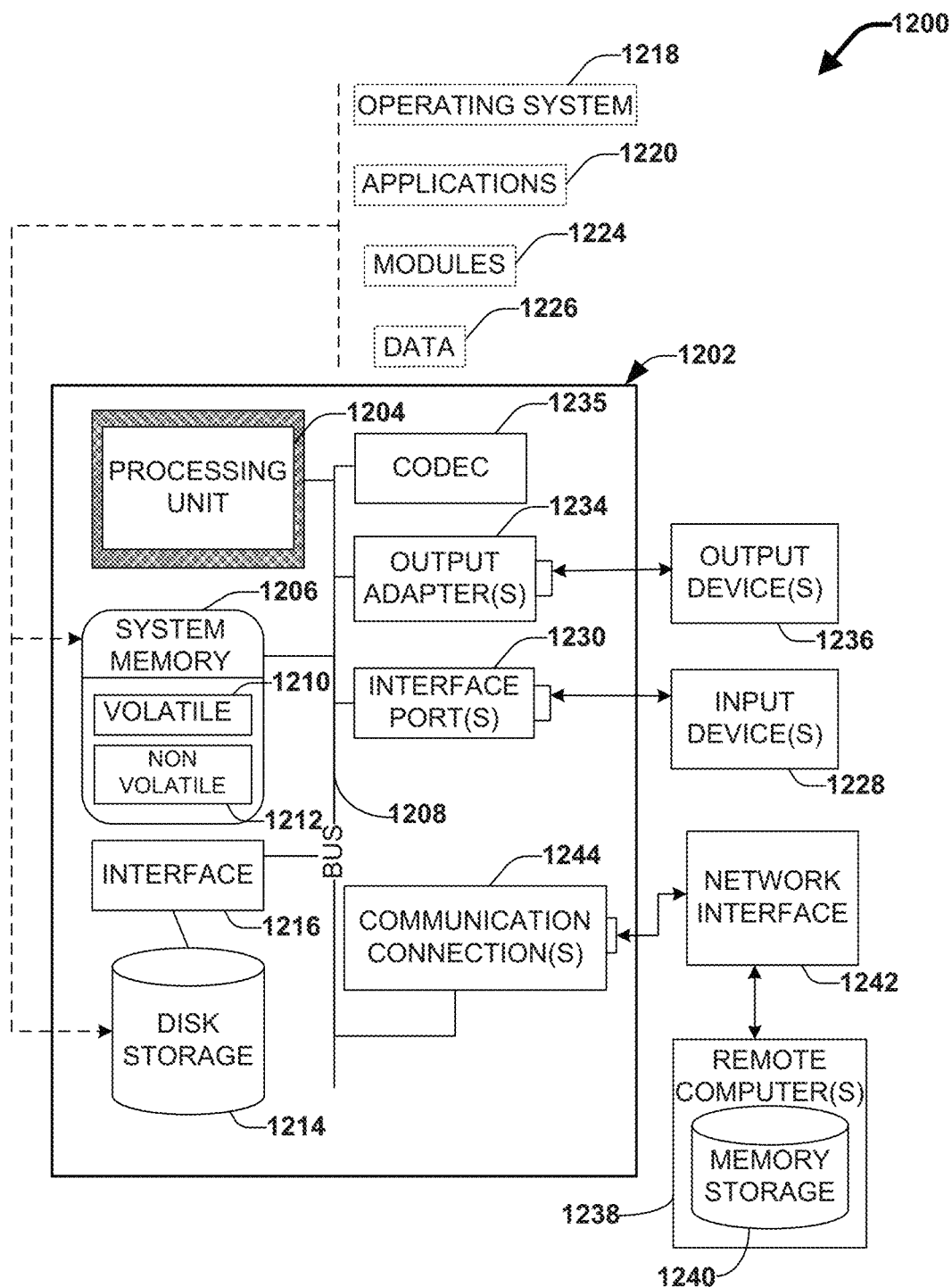
FIG. 12 illustrates a block diagram of an example, non-limiting operating environment in which one or more embodiments described herein can be facilitated.

With reference to FIG. 12, an example environment 1200 for implementing various aspects of the claimed subject matter includes a computer 1202. The computer 1202 includes a processing unit 1204, a system memory 1206, a codec 1235, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204.

The system bus 1208 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1206 includes volatile memory 1210 and non-volatile memory 1212, which can employ one or more of the disclosed memory architectures, in various embodiments. The basic input/output system (BIOS), containing the basic routines to transfer information between elements within the computer 1202, such as during start-up, is stored in non-volatile memory 1212. In addition, according to present innovations, codec 1235 can include at least one of an encoder or decoder, wherein the at least one of an encoder or decoder can consist of hardware, software, or a combination of hardware and software. Although, codec 1235 is depicted as a separate component, codec 1235 can be contained within non-volatile memory 1212. By way of illustration, and not limitation, non-volatile memory 1212 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1212 can employ one or more of the disclosed memory devices, in at least some embodiments. Moreover, non-volatile memory 1212 can be computer memory (e.g., physically integrated with computer 1202 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1210 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1202 can also include removable/non-removable, volatile/non-volatile computer storage medium. FIG. 12 illustrates, for example, disk storage 1214. Disk storage 1214 includes, but is not limited to, devices like a magnetic disk drive, solid state disk (SSD), flash memory card, or memory stick. In addition, disk storage 1214 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1214 to the system bus 1208, a removable or non-removable interface is typically used, such as interface 1216. It is appreciated that disk storage 1214 can store information related to a user. Such information might be stored at or provided to a server or to an application running on a user device. In one embodiment, the user can be notified (e.g., by way of output device(s) 1236) of the types of information that are stored to disk storage 1214 or transmitted to the server or application. The user can be provided the opportunity to opt-in or opt-out of having such information collected or shared with the server or application (e.g., by way of input from input device(s) 1228).

It is to be appreciated that FIG. 12 describes software that acts as an intermediary between users and the basic computer resources described in the suitable operating environment 1200. Such software includes an operating system 1218. Operating system 1218, which can be stored on disk storage 1214, acts to control and allocate resources of the computer 1202. Applications 1220 take advantage of the management of resources by operating system 1218 through program modules 1224, and program data 1226, such as the boot/shutdown transaction table and the like, stored either in system memory 1206 or on disk storage 1214. It is to be appreciated that the claimed subject matter can be implemented with various operating systems or combinations of operating systems.

A user enters commands or information into the computer 1202 through input device(s) 1228. Input devices 1228 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1236 use some of the same type of ports as input device(s) 1228. Thus, for example, a USB port can be used to provide input to computer 1202 and to output information from computer 1202 to an output device 1236. Output adapter 1234 is provided to illustrate that there are some output devices 1236 like monitors, speakers, and printers, among other output devices 1236, which require special adapters. The output adapters 1234 include, by way of illustration and not limitation, video and sound cards that provide a means of connection between the output device 1236 and the system bus 1208. It should be noted that other devices or systems of devices provide both input and output capabilities such as remote computer(s) 1238.

Computer 1202 can operate in a networked environment using logical connections to one or more remote computers, such as remote computer(s) 1238. The remote computer(s) 1238 can be a personal computer, a server, a router, a network PC, a workstation, a microprocessor based appliance, a peer device, a smart phone, a tablet, or other network node, and typically includes many of the elements described relative to computer 1202. For purposes of brevity, only a memory storage device 1240 is illustrated with remote computer(s) 1238. Remote computer(s) 1238 is logically connected to computer 1202 through a network interface 1242 and then connected via communication connection(s) 1244. Network interface 1242 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1244 refers to the hardware/software employed to connect the network interface 1242 to the bus 1208. While communication connection 1244 is shown for illustrative clarity inside computer 1202, it can also be external to computer 1202. The hardware/ software necessary for connection to the network interface 1242 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
a model training component that trains a machine learning model to perform an inferencing task on an initial medical dataset comprising medical data samples;
a grouping component that generates different subgroups of the medical data samples based on different metadata factors, wherein the inferencing task relates to evaluating a medical condition and wherein the different metadata factors comprise different clinical and non-clinical factors;
a performance evaluation component that determines subgroup performance measures for the different subgroups of the medical data samples, wherein the subgroup performance measures reflect measures of performance accuracy of the machine learning model with respect to the different subgroups of the medical data samples; and
an approval regulation component that determines whether the machine learning model meets an acceptable level of performance for deployment in a field environment based on whether the subgroup performance measures respectively satisfy a threshold subgroup performance measure.

2. The system of claim 1, wherein the subgroup performance measures respectively comprise uncertainty estimate values representative of a degree of uncertainty in the performance accuracy of the machine learning model with respect to the different subgroups of the medical data samples, and wherein the threshold subgroup performance measure comprises a maximum uncertainty value.

3. The system of claim 1, wherein the subgroup performance measures respectively comprise lower prediction bound values of the performance accuracy of the machine learning model with respect to the different subgroups of the medical data samples, and wherein the threshold subgroup performance measure comprises a minimum lower prediction bound value.

4. The system of claim 1, wherein the computer executable components further comprise:
a sample selection component that randomly selects at least some of the medical data samples included in the initial dataset from a collection of population data samples.

5. The system of claim 1, wherein the computer executable components further comprise:
a sample selection component that receives input identifying metadata factors associated with a potential degree of variation in the performance accuracy of the machine learning model, and wherein the sample selection component selects at least some of the medical data samples included in the initial dataset from a collection of population data samples based on the at least some of the medical data samples respectively comprising one or more of the metadata factors.

6. The system of claim 1, wherein the inferencing task comprises preforming a clinical diagnosis.

7. The system of claim 1, wherein based on a determination that a subgroup of the different subgroups of the medical data samples has a subgroup performance measure that fails to satisfy the threshold subgroup performance measure, the approval regulation component disapproves the machine learning model as having the acceptable level of performance for deployment in the field environment on new data samples included in the subgroup.

8. The system of claim 1, wherein the computer executable components further comprise:
an active learning component that identifies underperforming subgroups of the different subgroups of the medical data samples based on respective subgroup performance measures associated with the underperforming subgroups failing to satisfy the threshold subgroup performance measure; and
an active sampling component that retrieves additional data samples for the underperforming subgroups from a collection of population data samples and adds the additional data samples to at least one of a training dataset, test dataset, validation dataset or a regulatory validation dataset.

9. The system of claim 8, wherein the model training component further updates the machine learning model using at least one of the training dataset, the test dataset, the validation dataset or the regulatory validation dataset, resulting in an updated machine learning model, and wherein the performance evaluation component further updates the respective subgroup performance measures based on new measures of performance accuracy of the updated machine learning model with respect to the underperforming subgroups.

10. The system of claim 9, wherein the active sampling component continues to retrieve the additional data samples and the model training component continues to train, update and validate the machine learning model using the additional data samples until all of the subgroup performance measures respectively satisfy the threshold subgroup performance measure or a maximum amount, by cost or count, of the additional data samples authorized for retrieval has been reached.

11. The system of claim 8, wherein the active sampling component further determines a difficulty score for the underperforming subgroups, and wherein the active sampling component further selects the additional data samples that maximize a change to the difficulty score.

12. The system of claim 8, wherein the active sampling component determines priority scores for potential new data samples based on the respective subgroup performance measures of the underperforming subgroups that the potential new data samples respectively belong, and wherein the active sampling component further selects the additional data samples from the potential new data samples based on the priority scores.

13. The system of claim 8, wherein the active sampling component further determines an amount of the additional data samples to retrieve using an entitlement function, including first amount of additional training data samples of the additional data samples and a second amount of additional validation data samples of the additional data samples.

14. The system of claim 1, wherein the medical data samples comprise medical images and wherein the different metadata factors include image-based factors.

15. The system of claim 1, wherein the threshold subgroup performance measure is based on an accepted level of performance accuracy of an entity that currently performs the inferencing task in the field.

16. A method, comprising:
training, by a system operatively coupled to a processor, a machine learning model to perform an inferencing task on an initial dataset comprising medical data samples;
identifying, by the system, different subgroups of the medical data samples based on different metadata factors, wherein the inferencing task relates to evaluating a medical condition and wherein the different metadata factors comprise different clinical and non-clinical factors;
determining, by the system, subgroup performance measures for the different subgroups of the medical data samples, wherein the subgroup performance measures reflect measures of performance accuracy and uncertainty of the machine learning model with respect to the different subgroups of the medical data samples; and
determining, by the system, whether the machine learning model meets an acceptable level of performance for deployment in a field environment based on whether the subgroup performance measures respectively satisfy a threshold subgroup performance measure.

17. The method of claim 16, further comprising:
selecting, by the system, a first subset of the medical data samples included in the initial medical dataset from a collection of population data samples using a random selection method.

18. The method of claim 17, further comprising:
selecting, by the system, a second subset of the medical data samples included in the initial dataset from the collection of population data samples based on respective data samples included in the second subset comprising one or more metadata factors previously determined to be associated with a potential degree of variation in the performance accuracy of the machine learning model.

19. The method of claim 16, further comprising:
generating, by the system, usage exception information identifying a subgroup of the different subgroups of the medical data samples that the machine learning model does not have the acceptable level of performance on for deployment in the field based on a determination that the subgroup has a subgroup performance measure that fails to satisfy the threshold subgroup performance measure.

20. The method of claim 16, further comprising:
identifying, by the system, underperforming subgroups of the subgroups based on respective subgroup performance measures associated with the underperforming subgroups failing to satisfy the threshold subgroup performance measure;
retrieving, by the system, additional data samples for the underperforming subgroups from a collection of population data samples; and
updating, by the system, the machine learning model based on re-training the machine learning model using the additional data samples, resulting in an updated machine learning model.

21. The method of claim 20, further comprising:
updating, by the system, the respective subgroup performance measures based on new measures of performance accuracy and uncertainty of the updated machine learning model with respect to the underperforming subgroups; and
continuing, by the system, the retrieving of the additional data samples and the updating of the machine learning model using the additional data samples until all of the subgroup performance measures respectively satisfy the threshold subgroup performance measure or a maximum amount of the additional data samples authorized for retrieval has been reached.

22. The method of claim 20, further comprising:
evaluating, by the system, potential new data samples based on a degree to which the potential new data samples will contribute to optimizing the measures of performance accuracy and uncertainty of the machine learning model; and
selecting, by the system, the additional data samples from the potential new data samples based on the evaluating.

23. The method of claim 20, further comprising:
determining, by the system, an amount of the additional data samples to retrieve using an entitlement function.

24. A machine-readable storage medium, comprising executable instructions that, when executed by a processor, facilitate performance of operations, comprising:
training a machine learning model to perform an inferencing task on an initial medical dataset comprising medical data samples;
generating different subgroups of the medical data samples based on different metadata factors, wherein the inferencing task relates to evaluating a medical condition and wherein the different metadata factors comprise different clinical and non-clinical factors;
determining subgroup performance measures for the different subgroups of the medical data samples, wherein the subgroup performance measures reflect measures of performance accuracy of the machine learning model with respect to the different subgroups of the medical data samples; and
determining whether the machine learning model meets an acceptable level of performance for deployment in a field environment based on whether the subgroup performance measures respectively satisfy a threshold subgroup performance measure.

25. The machine-readable storage medium of claim 24, wherein the operations further comprise:
identifying underperforming subgroups of the different subgroups of the medical data samples based on respective subgroup performance measures associated with the underperforming subgroups failing to satisfy the threshold subgroup performance measure;

retrieving additional data samples for the underperforming subgroups from a collection of population data samples;

updating the machine learning model based on re-training the machine learning model using the additional data samples, resulting in an updated machine learning model; and updating the subgroup performance measures based on new measures of performance accuracy of the updated machine learning model with respect to the underperforming subgroups.

* * * * *